No. 803,968. PATENTED NOV. 7, 1905.
W. BARRY.
MAIL DISTRIBUTING APPARATUS.
APPLICATION FILED MAY 7, 1900. RENEWED DEC. 10, 1903.

8 SHEETS—SHEET 2.

No. 803,968. PATENTED NOV. 7, 1905.
W. BARRY.
MAIL DISTRIBUTING APPARATUS.
APPLICATION FILED MAY 7, 1900. RENEWED DEC 10, 1903.

8 SHEETS—SHEET 3.

Fig. 3

Witnesses
Geo. E. Fuch.
Emily R. Peck

Inventor
William Barry
by
Hubert E. Peck
Attorney

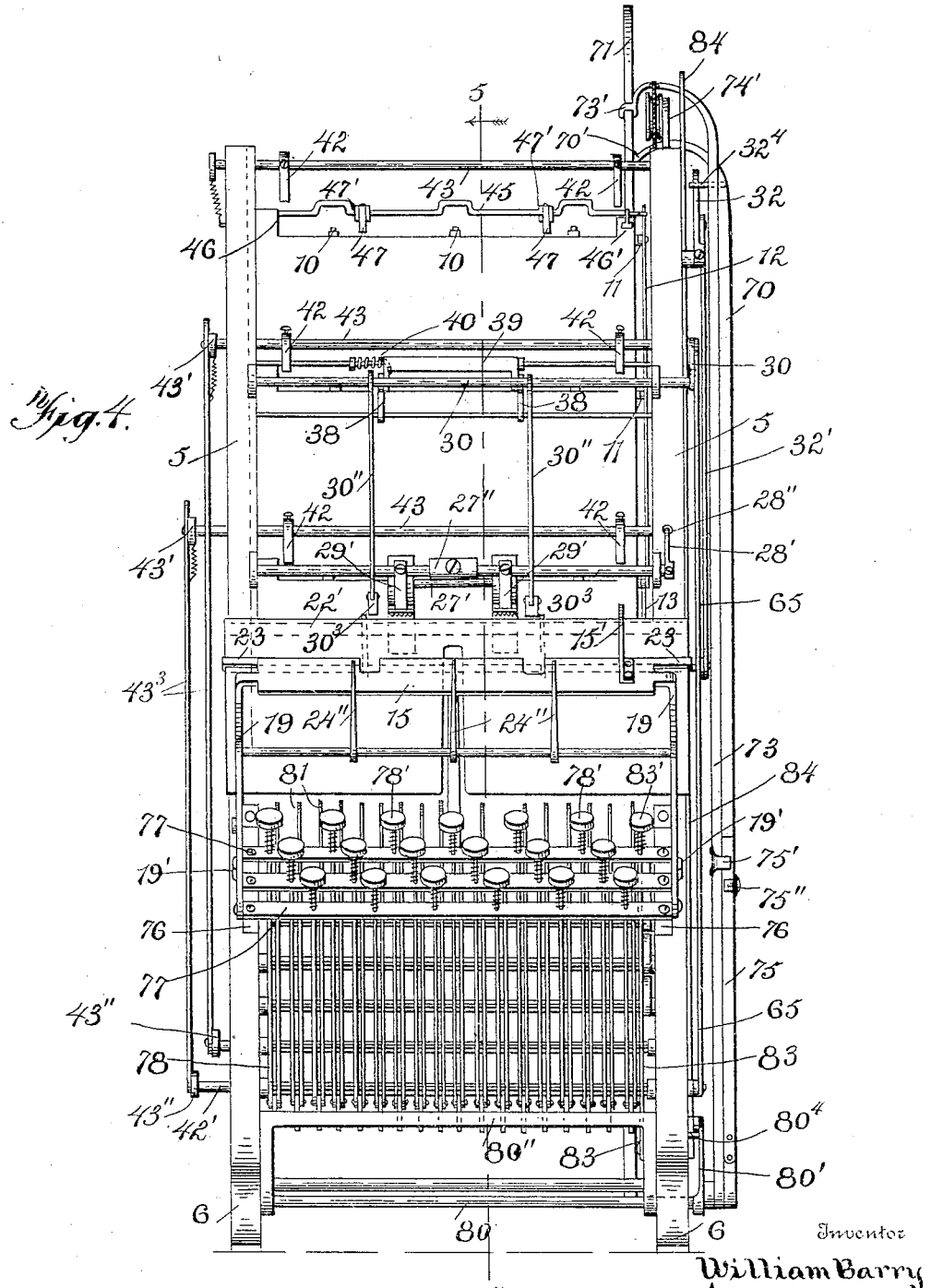

No. 803,968. PATENTED NOV. 7, 1905.
W. BARRY.
MAIL DISTRIBUTING APPARATUS.
APPLICATION FILED MAY 7, 1900. RENEWED DEC. 10, 1903.
8 SHEETS—SHEET 5.
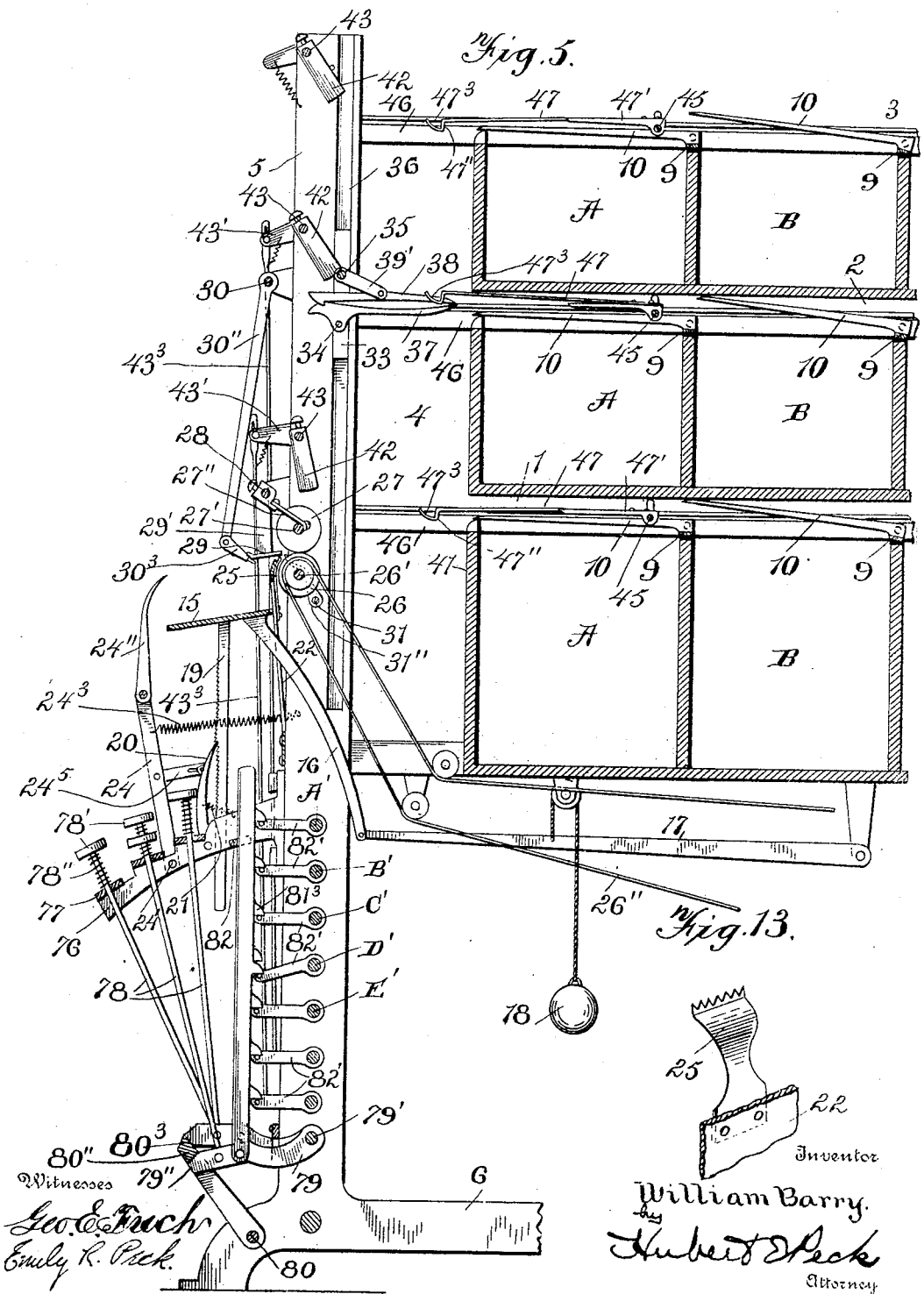

No. 803,968. PATENTED NOV. 7, 1905.
W. BARRY.
MAIL DISTRIBUTING APPARATUS.
APPLICATION FILED MAY 7, 1900. RENEWED DEC 10, 1903.
8 SHEETS—SHEET 6.
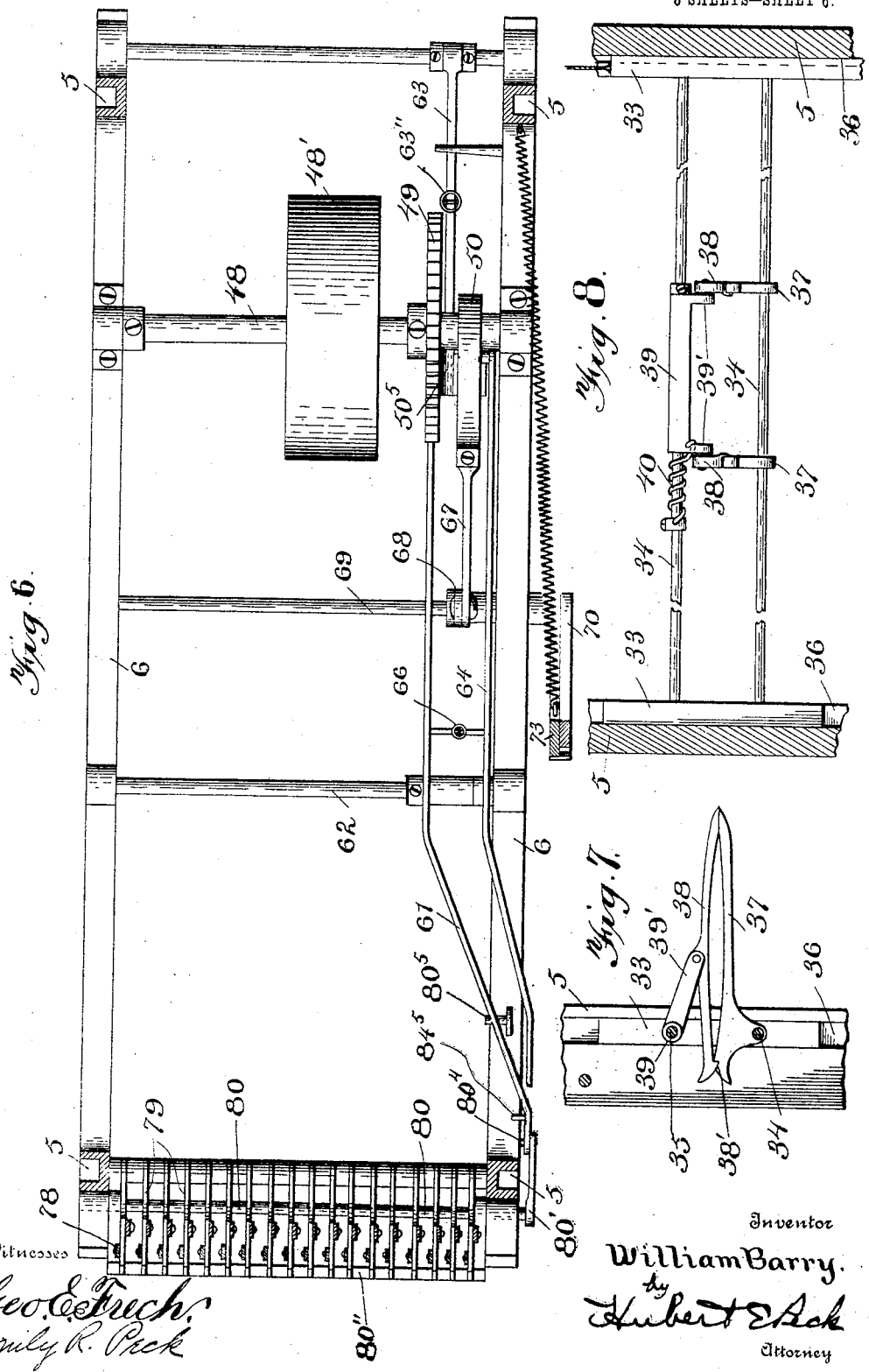

No. 803,968. PATENTED NOV. 7, 1905.
W. BARRY.
MAIL DISTRIBUTING APPARATUS.
APPLICATION FILED MAY 7, 1900. RENEWED DEC. 10, 1903.

8 SHEETS—SHEET 7.

Witnesses
Geo. E. Frich.
Emily R. Peck

Inventor
William Barry
by Hubert E. Peck
Attorney

No. 803,968. PATENTED NOV. 7, 1905.
W. BARRY.
MAIL DISTRIBUTING APPARATUS.
APPLICATION FILED MAY 7, 1900. RENEWED DEC. 10, 1903.

8 SHEETS—SHEET 8.

Witnesses
Geo. E. Frech.
Emily R. Peck

Inventor
William Barry
by
Hubert E. Peck
Attorney

UNITED STATES PATENT OFFICE.

WILLIAM BARRY, OF OSWEGO, NEW YORK.

MAIL-DISTRIBUTING APPARATUS.

No. 803,968. Specification of Letters Patent. Patented Nov. 7, 1905.

Application filed May 7, 1900. Renewed December 10, 1903. Serial No. 184,680.

*To all whom it may concern:*

Be it known that I, WILLIAM BARRY, a citizen of the United States, residing at Oswego, county of Oswego, State of New York, have invented certain new and useful Improvements in Mail-Distributing Apparatus; and I do hereby declare the following to be a full, clear, and exact description of the invention, such as will enable others skilled in the art to which it appertains to make and use the same.

This invention relates to certain improvements in mail-distributing apparatus, and the objects and nature of my invention will be apparent to those skilled in the art from the following description of the accompanying drawings, which merely show a construction as an example for the purposes of explanation from among many other constructions within the spirit and scope of my invention.

My invention consists in certain novel features in construction and in combinations and in arrangements of parts and details, as more fully and particularly pointed out and specified hereinafter.

Figure 1:
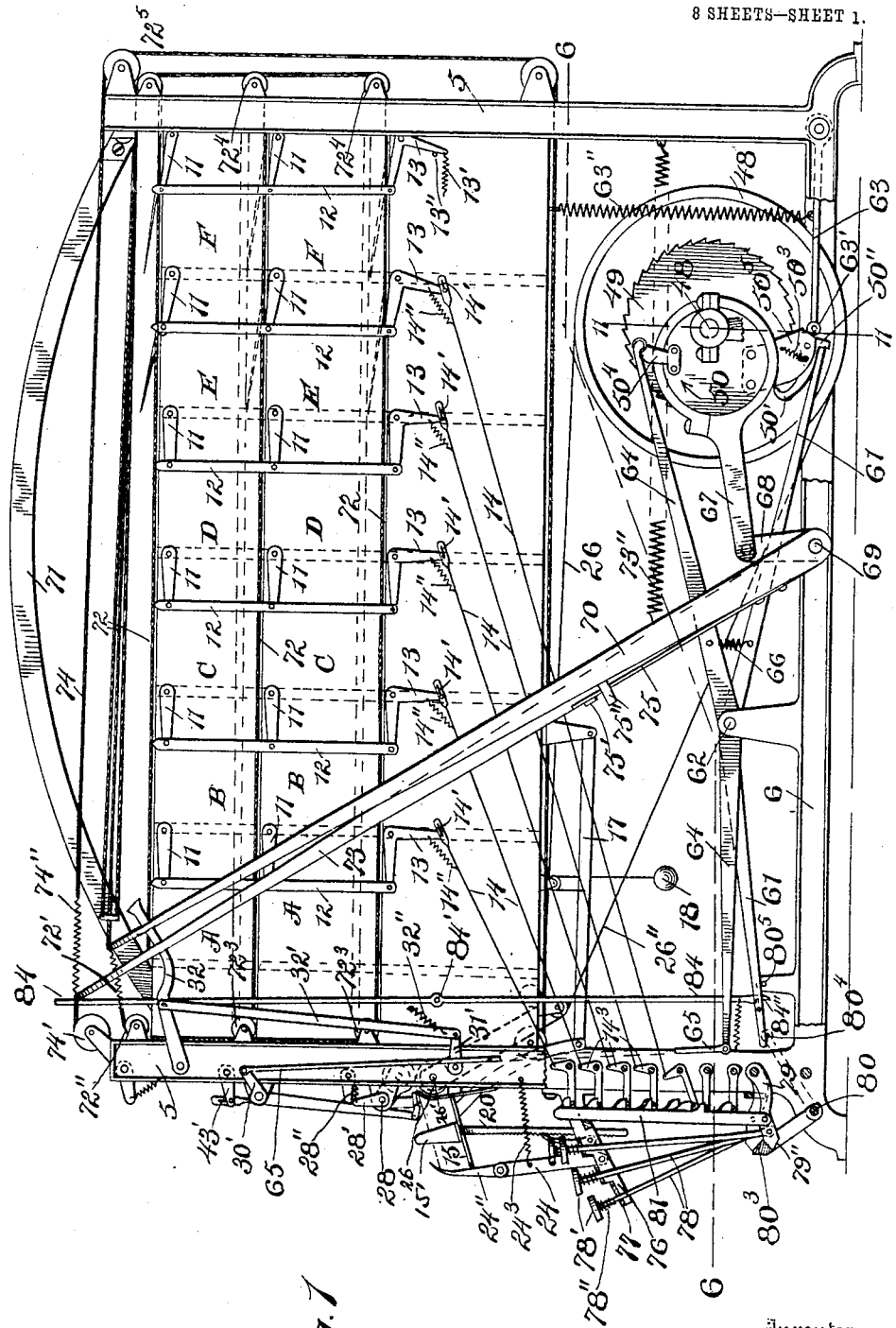
Figure 2:
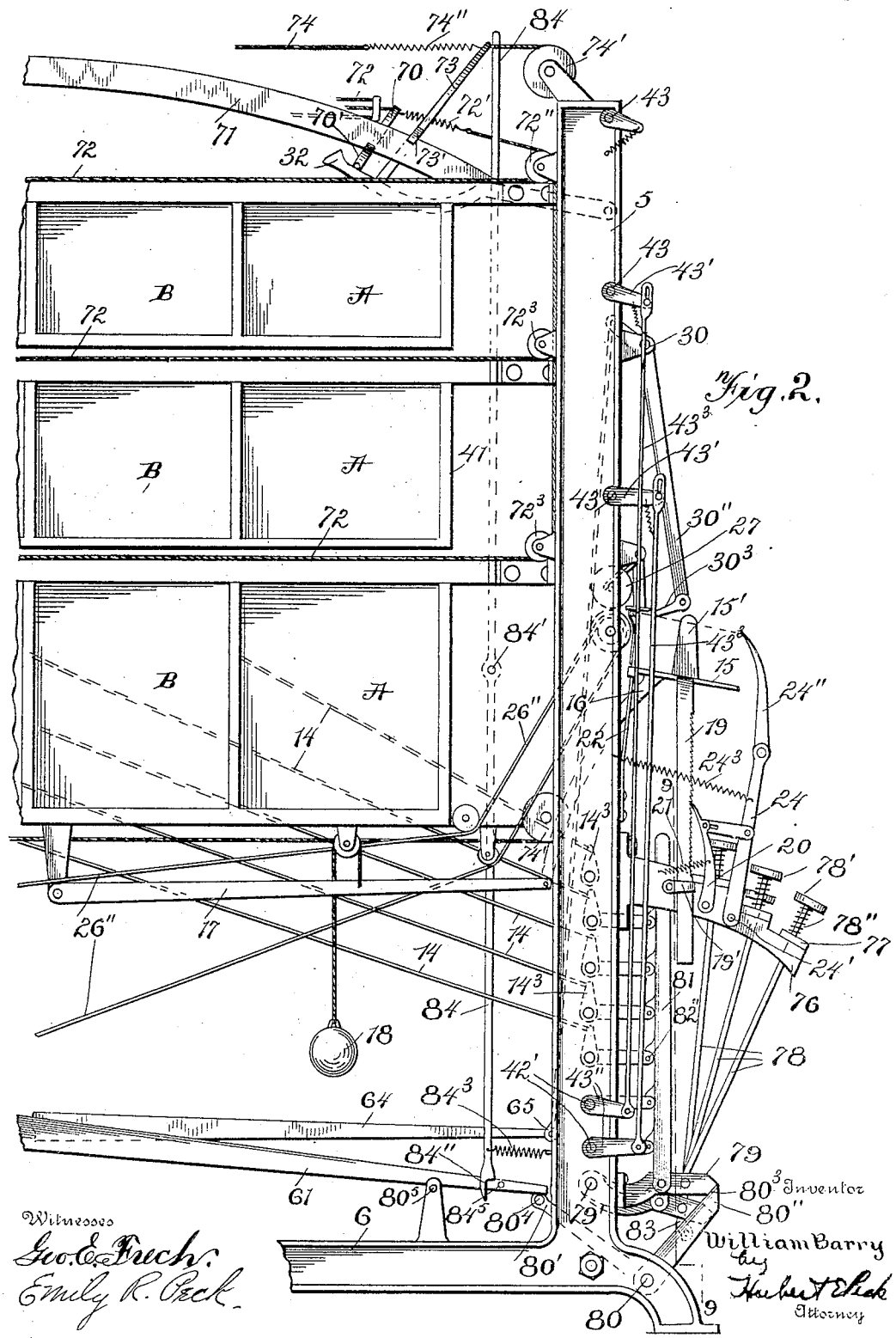
Figure 9:
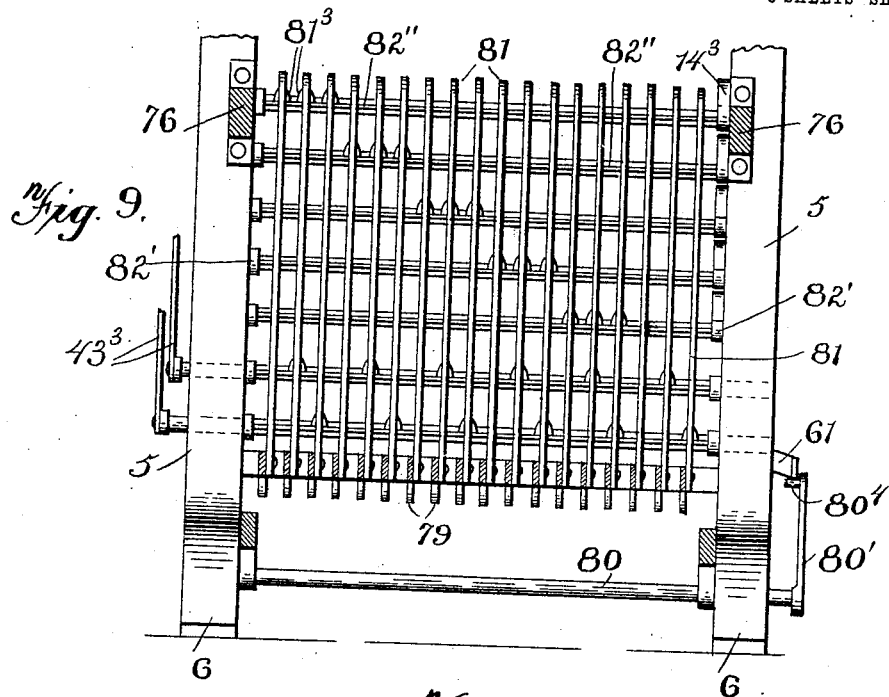
Figure 10:
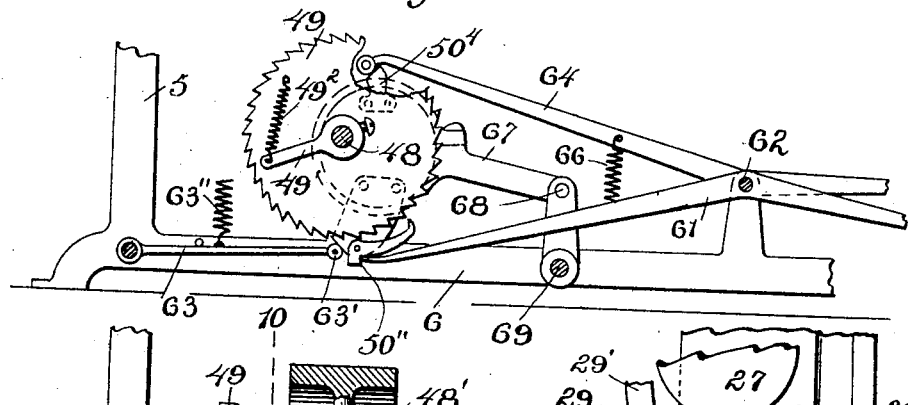
Figure 11:
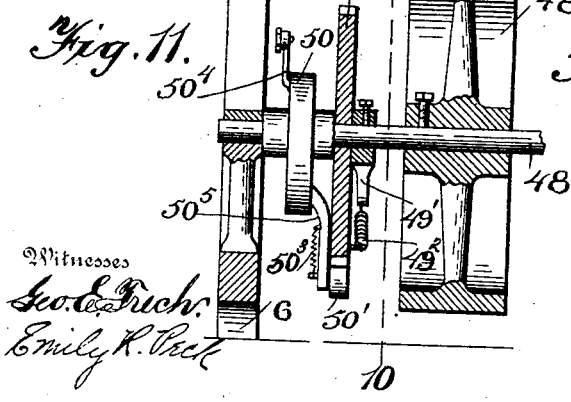
Figure 12:
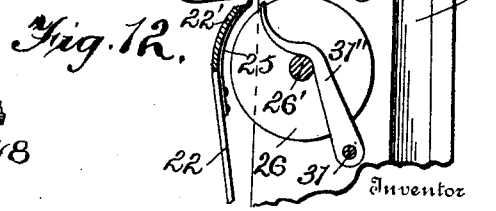
Figure 14:
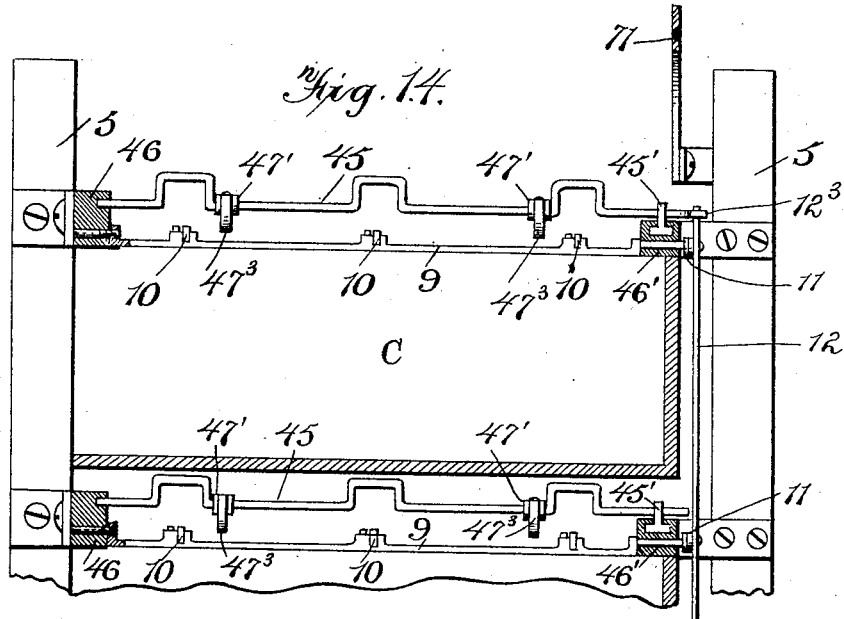
Figure 15:
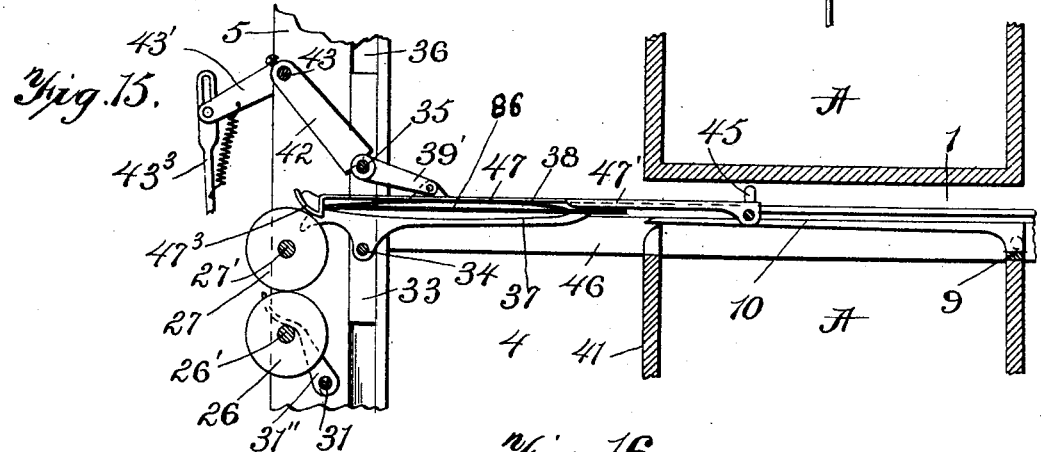
Figure 16:
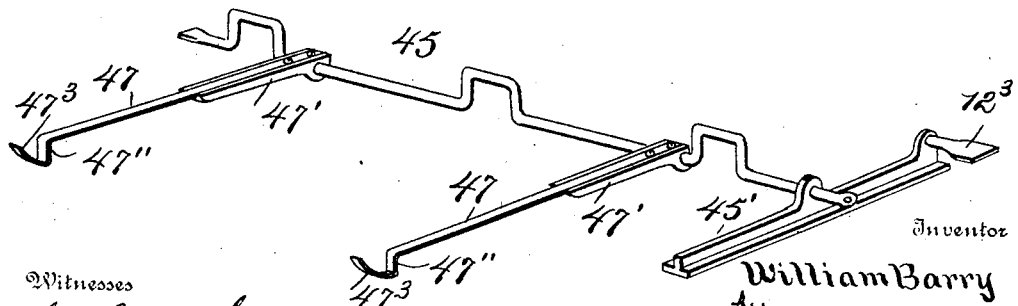

Referring to the accompanying drawings, Figure 1 is a side elevation of the apparatus looking at the back of the case of boxes, a portion of the frame being broken away, one key-bar being shown depressed, and the operative parts shown in their normal positions which they assume after completing their various strokes and in readiness to again start on their various movements to convey a letter to the particular box indicated by the key depressed, the key-bar and gates and stop controlled thereby being held set by the locking means until the depression of another key-bar, whereupon the previously-depressed key-bar and parts controlled thereby are released and return to their normal positions under the action of springs and gravity. Fig. 2 is an elevation looking at the front of the case of boxes, a portion of the boxes and apparatus being broken away, the parts being shown in the same relative positions as shown in Fig. 1. Fig. 3 is a top plan of the apparatus, the parts being all shown in their normal positions. Fig. 4 is a front elevation, one key being shown depressed and the lift or main letter-conveyer being shown opposite the box-passage of the second row or tier of boxes from the top. Fig. 5 is a vertical section taken on the line 5 5, Fig. 4. Fig. 6 is a horizontal section on the line 6 6, Fig. 1. Fig. 7 is a sectional side elevation of the main letter-conveyer, a portion of a frame-upright being shown. Fig. 8 is a detail front elevation of the main letter-conveyer. Fig. 9 is a detail vertical section on the line 9 9, Fig. 2, but showing the parts in their normal positions. Fig. 10 is a detail vertical section on the line 10 10, Fig. 11, the ratchet-wheel being partially broken away, the parts being shown in their normal positions. Fig. 11 is a detail cross-section on the line 11 11, Fig. 1, looking toward the left, the parts being shown in their normal positions. Fig. 12 is a detail view showing the feed-rolls in end elevation, illustrating the throat through which the letters are successively forced to said rolls and one of the swinging pusher-fingers which force the letters into the main conveyer after they have passed between the rolls. Fig. 13 is a detail perspective of one of the light yielding separator-fingers which extend across the path of the letters at the throat through which the letters move into the feed-rolls. Fig. 14 is a detail cross-section through the case of boxes, showing two of the branch passages, their rakes or letter-movers, and the box-gates being shown in end elevation looking toward the rear of said passages, various parts being broken away and other parts not being shown. Fig. 15 is a detail elevation, partially in section, showing the main letter-conveyer opposite branch passage 1 and containing a letter 86, the letter-mover of said branch passage shown in the position it assumes after dropping down in front of the front edge of the letter and just before said mover starts on its return or rearward movement, certain parts being broken away and some parts not being shown. Fig. 16 is a detail perspective view, enlarged, of one of the branch-passage letter-movers.

This apparatus, among other features, is designed to receive a pile of faced-up pieces of mail-matter and take the same successively from the top of the pile and distribute and deposit them separately at various predetermined points, such as letter-boxes.

According to the system now followed in post-offices in distributing mail-matter a clerk stands before a case made up of a large number of boxes and by hand places the individual pieces of mail-matter in the various boxes through the inner open ends thereof. Each box represents a certain postal route or destination, and thus the letters belonging to the same route are collected together in the same box and can be removed and secured together in a package for convenient handling thereafter. In the apparatus illustrated a case or series of boxes is shown, each of which represents a certain postal route to follow the system of hand-distribution now in vogue. A support for a pile of pieces of mail-matter is provided. A feeder removes the topmost letter laterally from the pile and thrusts the same past a suitable guiding means into a pair of rotating coöperating feed-rolls. The letter is then pushed by a suitable device into a vertically-movable lift or main-way letter-conveyer, which after receiving the letter moves upwardly and stops opposite a certain branch or box letter-passage, whereupon the letter-conveyer of said passage moves forward and takes the letter from said main conveyer and moves the letter along the boxes opening into or communicating with said branch passage, and a certain box gate or stripper intercepts the letter and deflects it into its box. The various letter-conveyers thereupon return to their normal positions. A series of manually-operated devices are provided corresponding to and indicating the boxes, respectively, a separate device (such as a key) being provided for each box. When a key is depressed, it sets the controlling devices, which stop the main conveyer at the particular branch passage communicating with the box indicated by the key depressed and also sets the gate belonging to said box. The depression of the key also throws the feeder into operative communication with its actuating means, and thereby causes the initial feed or movement of the letter from the common source or pile of letters. The depression of the key also actuates mechanism which places the driving power in operative communication or connection with the main letter-way conveyer and with the branch-passage conveyers and also with the pusher which forces the letter into the main-way conveyer, the arrangement in the specific example shown being such that the branch-passage conveyers start in their movements toward the main letter-way before the main-way conveyer starts on its feeding stroke, so that the letter-controlling means are set, and the letter is delivered to said main conveyer before said conveyer starts on its feeding stroke. I have thus generally outlined the operation of the specific example shown to add to the clearness of the following explanation; but I do not thereby intend to limit the scope or effect of my invention to compliance with the foregoing.

In the specific example illustrated I show a case made up of eighteen letter-boxes, although I do not wish to limit my invention to any particular number of boxes, as there is practically no limit to the number of boxes into which apparatus within the scope of my invention can distribute mail-matter. The boxes are arranged in the same vertical plane and in horizontal rows, the boxes being arranged one under the other, and consequently in vertical rows. In the arrangement shown for the sake of convenience there are three horizontal rows of boxes, each row being made up of six boxes arranged closely together and usually separated only by the vertical partitions. The boxes are usually closed at the rear and open at the front ends, so that the mail-matter distributed thereinto can be easily removed. The boxes have the top receiving or ingress openings, through which the letters are delivered thereinto. A branch or box letter space, way, or passage is provided longitudinally of each horizontal row of boxes and along or above the open tops or upper ends thereof. In the drawings I indicate the letter-passage, communicating with and above the lower row of boxes by the reference-numeral 1 and the corresponding passages for the remaining rows of boxes 2 3, respectively. At the front end of the case of boxes a vertical main letter way or passage 4 intercepts and passes all of said horizontal branch passages, which at their front ends open into and terminate at said main or vertical passage 4. The case of boxes is rigidly secured in and held elevated by a rigid supporting-frame comprising front and rear corner-posts or uprights 5, rigidly connected by longitudinal side bars 6 and cross-rails. The boxes of each horizontal row are correspondingly indicated by the reference-letters A B C D E F. The boxes at their open tops have the vertically-swinging gates, switches, or deflectors, each consisting of a horizontal rock-shaft 9, rigid with a series of lateral fingers 10, extending therefrom transversely across the top opening of the box. Each rock-shaft 9 is arranged transversely of the case of boxes and longitudinally above the top edge of the vertical partition at the far side of its box, and its several separated parallel fingers 10 extend forwardly therefrom over the box and usually over the opposite side partition thereof and rest on a suitable support, so that all the fingers of a horizontal row normally rest about in one horizontal plane. The gates are arranged to break joints or overlap each other to form a floor or surface without obstructions along which the letters can move. For instance, the fingers of the intermediate gates rest on the rock-shafts of the gates to the front thereof. To enable the corresponding gate-fingers of each horizontal row to rest in vertical planes or several straight lines, as shown in Fig. 3, and yet permit the fingers in each line to overlap, I show the ends of the fingers formed with slight offsets or lateral deflections. In the specific construction shown it is desirable to have the upper faces of the rock-shafts 9 depressed between the gate-fingers 10. I show this result attained by mounting the thin light fingers 10 in raised lugs or projections from said shafts and bars. The shafts 9 of each horizontal row of boxes are preferably arranged in the same horizontal plane and also the shafts 9 of the respective boxes in each vertical row are usually arranged in the same vertical planes, and said shafts at their ends are suitably mounted in proper supports, such as side bars extending along the case of boxes. The rock-shafts 9 of said box-gates all have crank-arms 11, rigid with their ends, and said cranks are shown arranged at the outer face of the back of the case of boxes. The crank-arms 11 of the corresponding boxes of each row are usually for the sake of convenience coupled together to move simultaneously by the vertical lift-bars 12. In other words, the gates of each vertical row of boxes are coupled together to operate as one by said bars or links 12, which are pivotally connected to the ends of the crank-arms 11. I show the lower end gate-shafts of each vertical row of connected shafts provided with rigid downwardly-projecting crank-arms 13, from which the various pull connections 14 extend, respectively, to actuating controlling devices, as hereinafter set forth. The arrangement is such that when a pull connection is actuated it will pull forward the particular crank-arm 13 to which it s attached, and hence lift all of the crank-arms 11 of the vertical series in which said particular crank is included through the medium of the lift-bar 12, and consequently elevate all of the gates controlled by said cranks. The ends of the pull connections can be formed with the longitudinal slots 14', in which the pivots of the crank-arms 13 can move independently of the connections. Retractive springs 14'' are secured to the connections 14 and to the crank-arms 13 and normally hold the pivots of said crank-arms at the inner ends of said slots. Said springs possess sufficient tension or strength to hold said pivots at their normal positions at the inner ends of said slots during the operation of raising the gates, so that, in effect, each pull connection is established through a spring 14''. The arrangement is such that when a series of gates is held elevated they can be depressed, as hereinafter set forth, independently of the pull connection 14, in which case the crank 13 will move rearwardly with its pivot moving in and the length of the slot 14' and against the tension of the spring 14'' and the parts will immediately return to the elevated position under the impulse of the spring 14'' when the depressing pressure is released. The box-gates are normally closed and rest horizontal across the tops of their respective boxes excepting the last boxes F of the horizontal rows are normally open for the entrance of mail-matter. I show these normally open boxes provided with swinging gates the same as the other boxes; but my invention is not so limited. The crank-arms 11 of the said last box F are connected by a bar 12 the same as the cranks of other box-gates, and the shaft of the lower box-gate also has a crank-arm 13; but said crank-arm has no pull connection, but has a retractive spring 13' secured thereto, which normally draws said crank against a stop 13'' and yieldingly and normally holds the said last gates open, and yet the arrangement is such that said last gates can all be simultaneously depressed against the tension of spring 13' by the application of the proper force.

15 is a horizontally-disposed table or support to receive the common pile of faced-up letters. This table can be inclined, if desired, from its inner longitudinal edge downwardly and outwardly. The table is shown with the upwardly-projecting end stop 15', against which the ends of the letters are alined. The table is arranged transversely across the front end of the main frame just in front of the two front end posts and at a suitable elevated point above the bank or series of keys, hereinafter described. This table is vertically movable and is provided with mechanism for yieldingly pressing the same upwardly. In the example shown the table 15 is provided with a rigid approximately central depending arm 16 at its lower end loosely coupled to the front end of a horizontal vertically-swinging lever 17 beneath the case of boxes and fulcrumed at its rear end. This lever is provided with and is coupled to a weight 18, which constantly draws the lever upwardly, and consequently yieldingly presses the table in the same direction. 19 represents two vertical legs rigid with and depending from the ends of said table and at their lower portions passing loosely through the guides 19'. If desirable, the front edges of said legs can be formed with downwardly-facing ratchet-teeth, as shown.

20 represents upwardly-projecting pawls pivoted at their lower ends and having the toothed upper ends yieldingly held into engagement with the ratchets of the legs, respectively, by the retractive springs 21. It will thus be noted that the table is free to move upwardly under the impulse of the weight, but is held by said pawl-and-ratchet mechanisms against downward movement until the pawls are swung outwardly from the ratchets. As the table with its pile of letters is usually only slightly overbalanced and forced up by the weight mechanism before described, the initial feeder, which takes the topmost letters successively from the pile, might in making its feeding stroke depress the table and pile of letters, and hence prevent the feeder from properly taking hold of and feeding the letter. The possibility of this occurring is avoided by providing said pawl-and-ratchet mechanism, which holds the table positively against downward movement and yet permits the free upward movement of the table as the pile of letters thereon is reduced.

22 is a guide or stop plate or wall arranged transversely across the front end of the frame and preferably secured to the front end posts of the frame at or near its lower edge, from which said plate is curved or deflected somewhat upwardly and outwardly. This plate extends vertically a distance equal to the full travel of the table and is arranged close behind the same to form a backing or alining stop wall or face for the inner longitudinal edges of the letters piled on the table. The table can have inner end corner guides or clips 23 partially embracing and sliding on the vertical edges of said plate 22. The letters are piled one on the other flat on said table with their longitudinal edges parallel with the longitudinal edges of the table and with their addressed faces upwardly, so that the operator in front of the machine can look down thereon and read the address of the topmost letter at a glance. Suitable mechanism is provided to hold the letters down in the proper pile on the table and against said rear guide-wall 22 without obstructing the addressed face of the topmost letter. As a means for this purpose I show a vertically-swinging frame 24 in the form of a bail pivoted at its lower ends at 24' to permit the bail to swing toward and from the table. 24" represents holding-fingers rigid with and extending vertically from the top cross-bar of this bail. These fingers are usually separated and parallel with each other and extend upwardly in front of the letter-supporting table and have their top ends deflected inwardly to rest on the topmost letter of the pile on the table and exert sufficient downward pressure on the pile of letters to hold them in proper position and yet permit free and easy inward withdrawal of the topmost letter under the action of the initial feeder. The swinging frame 24, with its fingers 24", is yieldingly held rearwardly toward the front edge of the table and the pile of letters thereon, clearly as shown in Fig. 1, by the retractive spring 24³, secured to the swinging frame and to the main frame. The longitudinal upper end of the wall 22 is curved inwardly and upwardly (see 22') to form a guide and base for each letter as it is moved laterally from the pile by the initial feeder. One or more yielding separator-fingers 25 are carried by said wall 22 and project a slight distance above the top edge thereof to hold back the letters under the one being fed. (See Figs. 12 and 13.) The upper end of each separator-finger can be roughened or toothed, as shown, to rub along the under face of the letter being moved over the edge of the wall 22 into the feed-rolls hereinafter described.

26 is a continuously-rotated feed-roll, which can be formed in one or more sections all rigidly secured on the cross-shaft 26', mounted suitably in or on the front end posts of the main frame, and suitably rotated, as by an endless cord or belt 26", from a pulley or wheel on the main drive-shaft of the machine and passing around suitably-arranged guiding idler-pulleys. This horizontal feed-wheel is arranged just behind the upper edge of the wall 22, preferably so that its rearwardly-moving upper face is immediately in rear of the top edge of said wall 22, over which the letters will pass directly onto said roll. The positively-driven roll 26 coöperates with and drives and is arranged beneath and in contact with an upper roll 27, which can be made in one or more sections, all of which revolve loosely on a shaft 27', rigidly secured to lateral arms 27", fixed to a rock shaft or rod 28, arranged transversely of the front end of the main frame and mounted in suitable journal-boxes secured to the front posts thereof. Said rock-shaft 28 has a crank-arm 28' rigid therewith. A retractive spring 28" is secured to said arm 28' and at its opposite end is secured to a front post of the frame. This spring constantly acts, through the rock-shaft 28 and arms 27", to yieldingly hold the idler friction-driven feed-roll 27 down to the under positively-driven roll to yieldingly grip letters of varying thicknesses and cause the rolls to rapidly move the letters rearwardly between them. Said rock-shaft 28 also has the presser feet or guides 29 attached thereto by lateral depending arms 29', rigid therewith and at their lower ends rigid with flat plates or heads 29, which form the presser or guide feet and are located over the inner edge of the topmost letter of the pile on the table and over and opposing the top edge of the wall 22, so that, in effect, a guiding-throat for the letters is formed by said wall 22 and the said presser-feet, and said feet hold down the inner portions of the letters and direct them into the bite between the feed-rolls.

A suitable initial feeding device is provided to take the topmost letters of the pile on the table successively therefrom and force the same under said feet and over wall 22 and the thin spring separator-finger into the bite between the two feed-rolls. Various devices can be employed for this purpose. As a convenient construction I show a rock-shaft 30, arranged transversely and horizontally of the front end of the frame and suitably mounted to or on the front posts a distance above the table and pile of letters. One end of this rock-shaft is extended and has the horizontally-disposed crank-arm 30' rigid therewith and to which the operating connections, as hereinafter described, are coupled for rocking said shaft to effect the feeding operation. One or more arms 30" are rigid with and depend from said rock-shaft 30, and at its lower end each arm is provided with a feeding finger or toe 30³ so constructed as to run over the topmost letter without moving the same when said feeder-arms swing outwardly, but so as to force the topmost letter from the pile and into the feed-rolls when the rock-shaft is swung in the opposite direction and the feeder-arms are swung inwardly. The feeder usually tends to lift the inner portion of the topmost letter against said feet, and the feeder-fingers move up to the bite between the rolls. Said feeder-fingers are arranged in different vertical planes from the feet, so that they can swing into the rolls past said feet.

If found desirable, suitable mechanism can be and often is provided to forcibly push each letter by its rear edge into, to insure its proper reception by, the main letter-conveyer hereinafter described and to free the letter from said rolls for its upward movement. As a means which can be employed for performing this function I show a horizontal rock-shaft 31, extending between and mounted in or to the two front posts and arranged below the plane of the lower feed-rolls. One end of this rock-shaft 31 is extended and provided with a horizontally-disposed crank-arm 31', rigid therewith.

32 is a horizontally-disposed cam or trip lever fulcrumed at its front end to the upper portion of one of the front posts, so that said cam extends rearwardly along the rear side of the machine. 32' is a link pivotally joining said cam-lever and the crank-arm 31', and a retractive spring 32'' is provided to yieldingly hold said cam-lever at its limit of upward movement. The curved letter-pusher fingers 31'' are rigidly secured to said rock-shaft 31 and extend upwardly therefrom beyond the ends of the lower feed-roll and are of sufficient length to move across the letter-path as the shaft is rocked to swing the fingers rearwardly. The spring 32'' yieldingly holds the rock-shaft with said pusher-fingers extending upwardly and forwardly with their upper ends below the path of the letters passing through the rolls. When the cam-lever 32 is depressed, the shaft 31 is rocked and said fingers move upwardly and rearwardly and engage the rear edge of the letter, (the engaging ends of the fingers being properly curved for this purpose,) and hence push the letter forcibly to the rear and insure the complete entrance of the letter into the main-way conveyer. When the cam-lever is released, the spring 32'' returns the same and the pusher-fingers to their normal inactive positions.

The initial letter-feeding mechanism, including the feed-rolls, is usually, although not necessarily, located approximately at the lower end portion of the main letter way or passage 4, which passes the several branch passages ranging over and opening into the boxes of the several tiers. Any suitable mechanism is provided to receive the letters separately from said feed-rolls and convey each letter to the branch passage opening into the particular box in which the letter belongs. In the example illustrated I show a vertically-reciprocating letter conveyer, carrier, or lift movable up and down in said main letter-way from its normal position in rear of the feed-rolls and comprising a vertically-sliding support provided with a letter-clamp. The support shown consists of two vertically-disposed slide-blocks 33 33, rigidly connected by the two horizontal (usually parallel) cross-bars 34 35, which have the members of the letter-clamp applied to intermediate portions in the length thereof and are usually arranged one a distance above the other. Suitable slide ways or guides 36 36 are provided, in which said slide-blocks are confined to freely slide vertically. Said ways are usually formed by the vertical grooves extending longitudinally of the inner faces of the two front posts of the main frame. Said two ways preferably occupy the same vertical plane, which is in rear of the two feed-rolls. The letter-clamp shown consists of the two parallel rigid jaws 37 37 and the two movable spring-jaws 38 38. The lower jaws at intermediate points in their lengths are fixed on the rigid lower bar 34 and extend horizontally and transversely from a point in advance of said bar rearwardly above the same and terminate a distance in rear of said bar and usually near the rear vertical side of the main letter-passage 4. The upper movable jaws 38 38 are arranged above and correspond to the lower fixed jaws, respectively, and the coöperating or opposing jaws of each pair are usually parallel with each other and arranged in the same vertical plane. The two upper jaws are pivotally coupled to and carried by the upper bar or rod 35 through the medium of any suitable mechanism. For instance, I show a loose sleeve 39 on the central portion of the rod 35 and held against longitudinal movement thereon. This sleeve has the rearwardly and downwardly inclined arms 39' 39', rigid therewith, and the outer ends of these arms are pivotally joined to the jaws 38, respectively, at points near the centers of the lengths of said jaws by horizontal pivots. 40 is a coiled spring secured on the rod 35 and having its free end confined to one of the arms 39' and constantly pressing said arms downwardly, and hence yieldingly holding the upper movable jaws 38 down to the lower rigid jaws 37. The jaws of each pair preferably have their longitudinal inner letter-engaging faces longitudinally curved or concaved, so that the opposite ends only of the jaws engage, as more clearly shown in Fig. 7, and the front ends of the jaws are curved from their outer longitudinal edges inwardly and rearwardly to guide the letter entering from the feed-rolls into the jaws. This letter-clamp is normally arranged immediately in rear of the feed-rolls, with the bite between the front engaging faces of the jaws approximately in the same horizontal plane with the bite between the feed-rolls. When the clamp is in its normal position, the front ends of the jaws usually extend forwardly beside or adjacent to the ends of the feed-rolls—that is, the clamp-jaws overlap the feed-rolls. A letter is moved rearwardly between the feed-rolls and passes directly into said clamp over the rigid jaws and presses up the upper spring-held jaws, which yield to accommodate letters of varying thickness and shape. The open or reduced intermediate portions of the jaws are formed to receive letters of varying thickness and yet permit the ends of the jaws, particularly the rear ends thereof, to engage the thin edges of the letters and hold them straight and against doubling up. When the letter has passed from the bite between the feed-rolls and rests in and is supported by the clamp of the main letter-conveyer, the pushers 31" move rearwardly and engage the rear edge of the letter and force the same rearwardly completely into the letter-clamp and past the depending rearwardly-facing stop-shoulders 38', rigid with the front ends of the yielding jaws, and passing down to one side of the lower jaws, and which prevent forward movement of the letter after it has been forced completely into the letter-clamp. It should be noted that the letter lies flat or horizontally in the letter-clamp and that the pushers straighten the same therein, so that the length of the letter is approximately at right angles to the length of each jaw, and if the letter is very wide and projects rearwardly beyond the rear ends of said jaws the rear edge of the letter will engage and be stopped and alined by the rear vertical wall 41 of the main letter passage or way. It should be also noted that the letter-clamp is made of very light and thin material, and the entire letter-lift is light in weight and construction, as it is only called on to carry one letter at a time, and its formation and construction are somewhat exaggerated in the drawings for the purpose of clear explanation. The letter merely rests horizontally on the rigid jaws, and the upper movable jaws exert only such light downward pressure thereon as is necessary to hold the letter from accidental displacement, and yet will permit easy and ready withdrawal of the letter rearwardly from said jaws. The upper spring-jaws can rock on their pivoted joints and move vertically to accommodate letters of any practical size or shape. After the conveyer or clamp has received its letter certain mechanism moves the same vertically in the main letter way or passage, and suitable devices stop the elevator and hold the same opposite any one of the branch passages. As an example of what might be employed for this purpose I show movable stops 42 opposite each branch passage and movable into and out of the path of the main-way conveyer. Said stops 42 can be formed by crank or lateral arms depending from and rigid with rock-shafts 43, having suitable operating means. Each rock-shaft 43 is arranged horizontally between and mounted to the front posts of the main frame in front and out of the main letter-way. Each shaft usually has two of the stops 42 arranged near its ends, so that when said shaft is rocked in one direction said stops will swing rearwardly into the path of the main conveyer, and as the conveyer moves up said stops will engage the same, preferably engaging the end portions of the rod 35 thereof, and hence stop and hold the conveyer against continued upward movement. Said stops normally lie out of the path of the conveyer, except that the last stops 42 at the upper end of the main letter-way are held normally projecting into the path of the conveyer, which should be always stopped opposite the topmost branch passage if it has passed all the other branch passages, in which instance the letter carried by said conveyer belongs in a box of the topmost row. The topmost stops are shown pivoted and spring-held, so that the lift or conveyer can be removed and reinserted, if desired, at the top of the frame. The frame opposite each branch passage is provided with a set of the stops 42, properly arranged to stop the lift opposite said passage with the jaws in the horizontal plane of the passage, so that the letter can be drawn from the jaws directly into the passage without interference or obstructions. Each rock-shaft carrying the stops 42 (excepting the topmost rock-shaft) has a crank 43' rigid therewith and arranged at the side of the frame, and these cranks are separately connected with controlling or setting mechanisms, as hereinafter pointed out.

Each branch passage is provided with suitable moving or conveying mechanism to remove the letter from the main-way conveyer and move the same along the branch way until the letter is deflected into one of the boxes thereof by a box-gate. In the specific example illustrated each branch passage has a horizontal floor on which the letters slide on their flat faces with their long edges arranged transversely of the floor. This floor is composed of the overlapping gate-fingers 10, hereinbefore described. The specific form of letter-mover shown is, in effect, a rake. Each branch-passage conveyer, as shown in the specific example, consists of a cross-head 45, arranged transversely of the branch passage and above the box-gates forming the floor thereof. This head is arranged to move back and forth throughout the length of said passage over the box-gates. Suitable mechanism is provided to move and guide said head in its reciprocation. For instance, I show two parallel rails 46 46' rigidly secured along the ends, respectively, of the letter-boxes opening into the branch passage. These rails form the side walls of the branch letter way or floor. The rail 46 is shown with a longitudinal groove or guideway in its inner longitudinal face or edge, in which one end of the head 45 is confined to slide. The opposite end of said head projects over the rail 46' and through a horizontal slot or opening in the back of the case of boxes equal to the length of the path of movement of said head, and the head-operating device is applied to said extended end of the head. The back rail 46', over which the head extends, is formed with a longitudinal slideway or groove in which a slide-block 45' is confined to freely reciprocate, and the cross-head is secured to said slide-block, so that the block slides with the head and guides the same in its movement and holds the same against lateral displacement. The cross or rake head 45 is provided with one or more forwardly-projecting shouldered spring-fingers to pull a letter from the main letter-conveyer and draw the same along the floor of the branch passage. I show the head provided with two parallel horizontal forwardly-projecting rake or pull fingers 47 47, arranged parallel with the lines of gate-fingers 10 and in the spaces, respectively, between said lines of gate-fingers (see Fig. 3) and moving practically down between the gate-fingers. Each finger consists of a long strip of thin pliable spring metal at the rear end secured to a block $47'$, secured rigidly to the cross-head and extending forwardly a short distance under the spring-finger and preferably formed to guide the finger in its vertical movement and prevent lateral play thereof and also to extend up beside the finger and prevent a letter catching between the finger and the front end of the block on which the finger is secured. The front end of each spring-finger is formed with a depending rearwardly-facing catch-shoulder $47''$, having an upwardly and forwardly curved front edge $47^3$. The fingers of each rake are of the same length, and the arrangement of the operative mechanisms is such that all the rakes of the various branch passages are normally located at the extreme rear ends of the various branch passages, and the main-way conveyer stops at the front end of one of the branch passages in the operation of the machine before the branch-passage rakes arrive at the front ends of their passages. The said rakes advance to the front ends of their passages, and at their limits of forward movement the rake-fingers thereof extend completely across the main letter-passage and beyond the vertical plane in which the front shouldered ends of the main-way conveyer move in the vertical reciprocation of said conveyer. The rake-fingers of the particular branch passage at which the main-way conveyer has stopped engage the front edge of the letter held by said conveyer with the curved front ends $47^3$, which cause said fingers to spring upwardly and sweep forwardly over and transversely across the top face of the letter until the shoulders $47''$ of said fingers pass completely across the letter and spring down in advance of the front edge of said letter. The rake then starts on its return and feeding stroke, and the shoulders $47''$ of the fingers push the letter from the clamp of the main-way conveyer onto the floor of the branch passage-way and slide the letter along the floor of said passage formed by the gate-fingers. The letter drops flat face down into the box which has its gate elevated. The front stops of the letter-clamp of the main-way conveyer, hereinbefore described, prevent the letter pushing forward from said clamp when the forwardly-moving rake-fingers engage the rear edge of the letter and slide up over the same. In the specific example shown it is obvious that mechanism must be provided to momentarily depress the elevated box-gates, so that the cross-heads of the various rakes can move rearwardly past the same and so that said gates will at once spring up again and enable one of the gates to catch and deflect the letter moved by one of the rakes into the opened box. All of the rakes move back and forth simultaneously, although but one rake catches and moves a letter at each stroke. Also at each operation a box-gate is elevated in each branch passage, although but one of them catches a letter. To cause the momentary depression of the elevated gates, I show the upper ends of the push-bars 12, connecting the gate-cranks, so constructed as to project into the path of movement of a projection $12^3$, extending laterally from and rigid with the rear end of the slide-block of said head, when any one of said bars 12 is elevated. Said upper ends of the bars 12 are rounded, and as the rakes move back said rigid pin or projection $12^3$ engages the upper end of the bar 12, moved up to lift the box-gates controlled thereby, and forces said bar 12 down by reason of its cam-shaped upper end, and said bar 12 and its gates are held down until the rake cross-heads move over and pass the free front ends of the gates. The pin $12^3$ then slips past and releases the bar 12, which immediately springs up again with its box-gates. The pin $12^3$ is properly spaced with respect to the rake cross-heads and gates to press the gates at the proper movement and permit the passage of the rake cross-heads and allow said gates to spring up again before the front edge of the letter moved by one of said rakes reaches the front ends of the fingers of a momentarily-depressed gate. The rake cross-heads are thus allowed to pass the elevated gates and yet the gates return quickly enough to enable one of the gates to catch the letter in its passage and deflect the same into the box. This vertical play of the gates is permitted by the slotted operating connections herein before described, and the gates are quickly elevated by the springs at said slotted connections.

48 is the main drive-shaft of the machine, mounted at any convenient location. For example, said shaft is shown mounted transversely beneath the box-case on suitable rigid supports extending up from the bottom rigid side bars of the main frame. The driving power or motor can be operatively coupled to said shaft to continuously rotate the same in one direction. I show a balance wheel or pulley 48' rigid on the central portion of the shaft.

49 is a ratchet-wheel normally revolving continuously with the shaft. Although said wheel is mounted loosely on the shaft, usually near one end thereof, yet it is coupled thereto to rotate therewith under normal conditions by the lateral arm 49', rigid with the shaft and connected to the wheel by the stiff coiled spring $49^2$. This arm through its spring connection with the wheel causes the rotation thereof, yet permits the wheel to yield and avoid a heavy blow or shock when sudden pressure or work is thrown on the wheel.

50 is an eccentric mounted loosely on the shaft and normally inactive and arranged beside and adjacent to the ratchet-wheel. The eccentric is provided with a rigid radial arm $50^5$, extending therefrom beside the ratchet-wheel and having the pivoted dog 50' fulcrumed thereto. This dog has its toothed end arranged to engage a tooth of the ratchet-wheel, and thus lock the wheel and eccentric to rotate together with the drive-shaft. The heel of the dog is extended radially to form a stop shoulder or lug 50'', and a retractive spring $50^3$ is attached to the dog and constantly tends to draw the toothed end of the dog into engagement with the ratchet-wheel. The eccentric also has a rigid striker or cam-arm $50^4$ rigid therewith and projecting radially therefrom, usually at a portion thereof diametrically opposite the dog-support. The striker or cam-arm and the dog-support are usually secured to opposite side faces of the eccentric. The eccentric is thrown into and out of operative relation or connection with the ratchet-wheel by means of a horizontally-disposed trip-lever or rocker 61, arranged longitudinally of the bottom of the apparatus and extending approximately from the front of the framework rearwardly to a point beneath the rotating drive-shaft. This lever moves vertically on an intermediate horizontal fulcrum, such as transverse shaft 62, and the vertically-movable rear end of the lever is formed and arranged to extend along the under face of the dog 50' and abut squarely against the heel 50'' of said dog and hold the same out of engagement with the ratchet-wheel and against the tension of the dog-spring and also hold the eccentric against rotation. Suitable mechanism at the front end of the apparatus is provided to raise the front end of said lever 61 on the depression of any key, (as hereinafter described,) and hence depress the rear end of said lever out of engagement with the heel of the dog, whereupon the dog springs into locking engagement with the ratchet-wheel and carries the eccentric around one complete revolution, and as the revolution is completed the forwardly-extending dog runs along the end of said lever, which strikes the heel of the dog and automatically lifts the same from the ratchet-wheel and stops the rotation of the eccentric. The lever 61 is only momentarily depressed and at once returns to its normal position in readiness to engage the dog at each releasing operation.

63 is a horizontally-disposed arm fulcrumed to the frame at its rear end and having a roller 63' mounted on its front end, and said arm is yieldingly drawn upwardly by a spring 63'', with its roller engaging the outer cam edge of the bracket or support $50^5$ rigid with the eccentric and carrying the said dog. The cam edge of the said bracket $50^5$ is so formed that the upward pressure of the arm 63 thereagainst presses the bracket forwardly and holds the heel of the dog tightly against the end of the lever 61 and prevents rattling and looseness of the parts and accidental displacement and holds the parts together under a spring tension. Said spring-held arm also acts as a spring-brake on the eccentric to stop the same without a sudden jar as the roller of the arm rides over the end of the bracket $50^5$ as the dog is withdrawn from the ratchet-wheel.

The cam projection or arm $50^4$ actuates the initial feeder-operating mechanism through the medium of a horizontally-disposed vertically-swinging rocker or lever 64, having its forward end pivotally joined by a vertical rod 65 to the laterally-extending crank-arm 30' of the rock-shaft, to which the depending feeder-arms are secured. The said lever 64 is arranged longitudinally of and beneath the box-case and at a point intermediate its ends is fulcrumed on the shaft 62, so as to rock independently of the lever 61, which also rocks on the same axial line. The rear end of the said feeder-operating lever 64 extends up over the eccentric and into the path of rotation of the cam $50^4$ and is shown provided with an end antifriction-roller to engage and ride over said cam during the rotation of the eccentric. The outer edge of said cam is formed with a double incline having the intermediate elevated portion. When the initial feeder is in its normal rearward position and the eccentric is at rest, said end roller of the feeder-operating lever is held against the lower portion of the rear inclined face of said cam. When the trip-lever 61 releases the dog and causes the eccentric to rotate, said cam moves rearwardly and causes the roller of the feeder-operating lever to ride up said cam-face, which elevates the rear end of said lever and draws down the crank-arm 30' and swings out the feeder-arms. When said roller passes over the raised portion of the cam and drops down the opposite inclined face thereof, said crank-arm 30' is forced up by the opposite movement of the feeder-operating lever, and the feeder-arms are swung rearwardly to carry the letter into the feed-rolls. This feeding operation takes place at the very beginning of each rotation of the eccentric, and when the eccentric completes its single rotation the cam assumes the same position as before described and as shown in Figs. 1 and 10 in readiness to perform the initial feeding operation on the next release of the trip-lever 61. A retractive spring 66 is provided connecting the two rockers or levers 61 and 64 in rear of their fulcrums, and thereby yieldingly holds the lever 64 to its operating-cam and the lever 61 against the dog and returns said levers to their positions when they have been operated.

It will be noted that the cam or striker $50^4$ when at rest and in its normal position stops the initial feeder at its limit of inward movement, the feeder being yieldingly held in this position by feed-stroke actuating-spring 66. When the striker $50^4$ starts on its operative movement, the lever 64 is rocked thereby against the tension of spring 66 to move the initial feeder outwardly on its return stroke by the driving power of the machine. When the feeder reaches its limit of outward movement, the striker slips past or releases the lever 64, and the spring 66 thereupon rocks the lever and actuates the feeder on its inward or letter-feeding stroke. The feeder is hence yieldingly driven on its feeding stroke and can yield or even stop at any point in its feeding stroke to avoid mutilating mail-matter should the same wedge or refuse to enter the feed-rolls.

67 is a pitman extending forwardly from the eccentric-strap of the eccentric 50 and at its front end pivotally coupled to the upwardly-extending radial arm 68, rigid with the rock-shaft 69. 70 is an oscillating sweep or lever arm rigid with said rock-shaft 69 and extending from the end thereof upwardly at the rear of the main frame and box-case, preferably to a point above the box-case. The upper end of this sweep-arm is deflected laterally to a point approximately over the box-case, and its end is provided with a guide 70', fitting loosely the under edge of a curved guide rail or track 71, arranged longitudinally of and above the box-case and extending throughout the length thereof and suitably secured thereto and curved to conform to the arc in which said sweep-arm swings from the rock-shaft 69 as a center. Said sweep constitutes the operating or driving member for the branch-passage letter-conveyers through the medium of series of endless flexible connections. As a matter of convenience I show a separate endless flexible connection 72 for each branch-passage letter-conveyer. In the example shown three reciprocating branch-passage conveyers are shown, and hence I show three endless connections 72, all attached at both ends of each to the upper end of the oscillating sweep 70, so that when the sweep swings rearwardly it will pull all the connections in one direction and when it moves forwardly it will pull all of said connections in the opposite direction. One or more coiled springs 72' are interposed in said flexible connections in any suitable manner to take up the slack and yet permit the connections to stretch as the sweep reaches the higher portions of the arc in which its upper end moves. All said connections extend from the upper end of sweep-arm 70 forwardly to an idler-pulley 72'', mounted at one side of the upper front corner of the main frame and having its periphery formed to comfortably receive all said connections. The connections from thence extend downwardly at one side of the main letter-way, and at each branch passage one of the connections is deflected horizontally under an idler $72^3$ and along the rear side of the box-case beside a longitudinal opening in the case-back, through which the end of the rake-head of that passage projects. Each said horizontal portion of the various connections is secured to the projecting end of the rake-head of the passage to which it belongs. At the rear end of the box-case all of said connections pass under idlers $72^4$ and extend vertically, and at the rear upper corner of the frame all three connections pass over an idler $72^5$ and extend forwardly and horizontally and are secured to the upper end of the sweep-arm. It will thus be noted said connections are of various lengths to extend longitudinally of the various branch passages, respectively, and that all of the connections are moved simultaneously and equal distances by the sweep-arm. The sweep-arm is normally located above the front end of the box-case, about as shown in Fig. 1, and the various branch-passage letter-conveyers are so coupled in the endless connections that when said sweep-arm is in its normal position all of said conveyers are located at the extreme rear ends of their respective passages, as shown in Fig. 3. Hence when the operating-eccentric on the drive-shaft starts in on a revolution the pitman 67 is forced rearwardly and the sweep-arm is swung rearwardly and the various branch-passage conveyers move forwardly, and if any of the box-gates are open they are momentarily depressed to permit the passage of the rake-heads and then fly back to their open positions under the influence of the pull-springs, hereinbefore described. The sweep-arm moves rearwardly until the various fingers of the rake project forwardly across and beyond the main letter-way, and the eccentric then begins on the second half of its stroke and draws the pitman 67 forwardly and starts the sweep-arm forwardly on its return stroke, and consequently draws all the branch-passage conveyers or rakes rearwardly, and when the eccentric completes its revolution and stops the sweep-arm will be at its limit of forward movement and said conveyers at their limits of rearward movement. The main-way conveyer is also actuated and directly controlled by another sweep-arm and endless flexible connection, which sweep-arm, however, is controlled and actuated in one direction by the before-mentioned sweep-arm, which actuates the branch-passage conveyers. To this end, 73 is a vertically-oscillating sweep arm or lever, at its lower end loosely mounted on the rock-shaft 69 beside the sweep-arm 70, which is rigid with said shaft. Said arm 73 has its upper end deflected laterally over the track or rail 71 and formed with an end guide 73', straddling and slidable on the top edge of said rail 71, so that the under ends of said two sweep-arms are located in different vertical planes, and the upper end of one arm is in advance of the upper end of the other arm, so as to avoid interference of any character. The upper end of sweep-arm 73 is secured in endless flexible connection 74, arranged longitudinally and horizontally at the top and bottom of the box-case and vertically at the ends thereof and passing under and over the four corner idler-pulleys 74'. The connection passes vertically of the main letter-way and is secured to one of the slide-blocks of the main letter-conveyer. The main letter-conveyer and the sweep-arm 73 are so secured or connected in said endless connection that when said sweep-arm is at its normal position at the front end of the guide-rail 71 the main-way conveyer will be in its normal position behind and in readiness to receive a letter from the feed-rolls. 74" is a coiled spring included in the endless connection 74 for the same reason that spring 72' is included in the endless connections reciprocating the branch-passage letter-conveyers. 73" is a coiled retractive spring having one end secured to the main frame and its forward end secured to said main-conveyer sweep and exerting its tension to move said sweep-arm rearwardly and effect the feeding stroke of the sweep-arm. Said arm is actuated in one direction by said spring and in the opposite direction by the branch-passage-conveyer sweep-arm 70 through the medium of a heavy plate-spring 75, carried by sweep-arm 70, and a stop 75' rigid with sweep-arm 73.

75 is the plate-spring, arranged longitudinally of the sweep-arm 70 at the front edge thereof, with its upper free end springing forwardly therefrom and its lower end secured thereto. A guiding-loop 75", rigid with arm 70, limits the forward movement of the free end of said spring away from the said arm. The stop-lug or projection 75' is rigid with the sweep-arm 73 and projects laterally therefrom in front of the free end of said spring 75 and is adapted to engage and rest against the free end of said spring. The spring 75 is of greater power than and works against the spring 73", which swings the sweep-arm 73 in one direction. When the two sweep-arms are in their normal positions at rest, as shown in Fig. 1, the stop 75' rests against the free end of spring 75, and said spring is partially compressed against the sweep-arm 70, and the arm 73 is held in its normal position thereby against the action of its spring 73". When the lever 61 releases the dog 50' and the eccentric is thus thrown in gear with its driving power, the sweep-arm 70 starts on its rearward movement to move the branch-passage conveyers forwardly; but the spring 75 is of sufficient power to hold the arm 73 against rearward movement until said spring 75 reaches its limit of forward movement by engagement with the outer end of loop or guide 75". Said spring 75 then ceases to exert its restraining force on the sweep-arm 73, and said arm is free to move rearwardly under the impulse of its spring 73" following the arm 70, and thereby lifting the main-way conveyer in the main letter-way until said conveyer engages one of the stops opposite a branch letter-passage which holds the main conveyer against continued upward movement and the sweep 73 against continued rearward swing. The operating-spring 73" holds the sweep 73 and the main conveyer in this position until the sweep 70 has completed its rearward stroke and has started on its forward stroke and moved the branch letter-conveyers out of the main letter-way, and consequently out of the path of the main conveyer. The main-way conveyer remains in its elevated position until the free end of spring 75, during the return or forward movement of the sweep-arm 70, engages the rigid projection 75' of the arm 73 and is slightly compressed by the continued forward movement of arm 70, whereupon the power of spring 73" will be overcome and the arm 73 will be swung forwardly with arm 70 to the limits of forward movements of said arms, thereby moving the main-way conveyer downwardly to its normal position. It will thus be observed that the main-way conveyer does not start on its lifting or feeding stroke at once when the operating mechanisms of the machine have been set in operation, but waits until the initial feeding operation has been effected and it has received the letter from the feed-rolls. Also before the sweep-arm 73 starts on its rearward stroke the projection $32^4$ of the sweep-arm 70, which has started on its rearward stroke, engages the rear free end of the cam-lever 32 and depresses said free end thereof and operates the pusher-fingers 31", hereinbefore described, to force the letter completely into and insure its proper position in the main-way conveyer. When the projection $32^4$ passes the cam-lever 32, said lever and the parts controlled thereby return to their normal positions. When the sweep-arm 70 returns forwardly to its normal position, it slips past said cam-lever and again swings the same, but no function is then performed by the parts connected therewith, as there is no letter in the feed-rolls, or other arrangements could be easily effected whereby the return of the sweep 70 will not cause a movement of said cam-lever. The movements of the parts are so timed that the mainway conveyer can reach the topmost branch passage or any other branch passage before the series of branch-passage conveyers reach the main letter-way, and also so that said branch-passage conveyers start on their return stroke and withdraw from the main letter-way before the main-way conveyer starts on its downward or return movement.

*The controlling and starting mechanism.*— The front end of the main frame in the example illustrated is provided with forwardly-projecting rigid supporting-brackets 76 76, having the series of parallel horizontal cross-guide plates 77, secured on their step-like upper edges. Series of vertically movable or reciprocating push or key bars 78 extend loosely through said guide-plates. Said key-bars are usually provided with keys 78' on their upper ends, and coiled expansive springs 78" are usually located on side bars between said guide-plates and the keys to return each key-bar and connected parts to its normal position. The keys can be arranged in step-like series, as shown, and closely arranged to form a bank or convenient keyboard, which I generally prefer to locate beneath the plane of the supporting-table for the common pile of letters and adjacent thereto, so that the operator can look down and see the address on the topmost letter of the pile and also almost instantly see and detect the key he wishes to strike to send said letter to the box in which it belongs. In other words, the letter-pile and keyboard are both in the range of vision of the operator, and he does not have to turn his head from the letter to the keyboard. I usually provide as many keys as there are letter-boxes, and each key is provided with suitable indicating devices corresponding to or indicating the boxes, respectively. Thus usually each key is provided with characters indicating a postal route, and there is a box for each route of the series of routes indicated by the series of keys. A series of forwardly-extending vertically-swinging levers 79 are all separately fulcrumed at their rear ends loosely on a cross-bar 79' between front uprights of the frame. The push-bars 78 at their lower ends are pivotally joined to said levers, respectively, a slight distance in rear of the front ends thereof. I usually provide as many levers 79 as there are push-bars corresponding to letter-boxes, and each lever and its push-bar are independent of the other levers and push-bars. The outer end of each vertically-swinging lever 79 is beveled or inclined outwardly and upwardly from its lower edge. (See 79".) 80 is a horizontal transverse rock-shaft mounted in the main frame below said levers 79 and having a lateral or crank arm 80', rigid therewith and extending rearwardly and upwardly therefrom and at its free end having a lateral projection $80^4$ beneath and on which the front end of the trip-lever 61 rests. This rock-shaft 80 carries an upwardly and forwardly projecting bail 80'', rigid therewith and having its cross rail or bar arranged beneath and resting against the beveled or inclined front ends of the levers 79. The upper edge $80^3$ of this front cross-bar is beveled downwardly and rearwardly, and when the levers and bail are in their normal positions the said inclined ends of the levers rest on said inclined edge of the bail. It will thus be readily understood that when any key and its lever are depressed the said beveled surfaces will force the bail outwardly to permit the downward passage of the lever, and when the end of the lever slips past said beveled edge of the bail said bail will swing inwardly above the end of the lever, and thus lock the lever and push-bar depressed. When the depressed key is thus held locked, the remaining levers in their normal positions rest on the bail as before, so that the instant another lever is depressed by its key the bail will be swung out, releasing the previously-depressed lever and its connected parts, and then swinging in again will lock the last lever depressed. The bail is yieldingly held in against the said lever ends by the spring holding the front end of trip-lever 61 down against the stop 80, limiting the downward swing of its front end and through the medium of the crank-arm from the rock-shaft carrying said bail. It will thus be observed that the depression of any key throws the initial feeder and the main and branch passage conveyers all into gear or operative communication with the driving power or, as in this case, with the main drive-shaft, so that each part performs a stroke or action sufficient to start a letter from the common source and deliver the same to its particular box. This action is attained by each outward swing of the bail, which lifts the front end of the trip lever 61 by the crank-arm 80 and releases its rear end from the dog 50' and permits the dog to lock the actuating-eccentric with the driving-shaft. As the arm 80' moves up and drops back at once as the lever 79 moving down slips past the bail, the trip-lever after releasing the dog at once returns to its normal position under the action of its spring in readiness to catch and throw out the dog when the eccentric completes its single revolution. The keys also set the mechanisms which determine the particular letter-box to which a letter is to be delivered. Various controlling mechanisms can be provided for this purpose. As a convenient means I show the series of parallel vertical slide-plates 81 at their lower ends pivotally joined to the levers 79, respectively, at points in advance of the common fulcrum axial line of said levers. Each lever 79 is pivotally joined to its own slide 81, and hence there are as many slides as levers 79 and usually as many slides as there are letter-boxes. The slides are arranged close together in a vertical row in rear of the key or push bars, and suitable frame bars or guides are provided to hold the slides properly in position. In the present instance a top cross-bar 82 is arranged transversely of the upper portions of all said slides and is slotted to separately receive and guide the slides. A vertical series of rock-shafts is arranged immediately in rear of the row of slides. Each slide is arranged to rock one or more rock-shafts on the depression of a key and consequent downward movement of the slide connected therewith. The rock-shafts are connected to control the destination of a letter. Thus in the particular arrangement shown the rock-shafts A', B', C', D', and E' are connected to operate the gates of the vertical series of A, B, C, D, and E letter-boxes, respectively. Each rock-shaft has an end crank arm $14^3$, and the five pull connections 14 are coupled to said crank-arms $14^3$, respectively. The two rock-shafts 42' have the end crank-arms 43'' pivotally joined, respectively, with the crank-arms 43' for operating the stops 42 by the pull connections $43^3$. If desired, each pull connection $43^3$ is connected with its crank-arm 43' by a slot-and-pin connection and a pull-spring the same as the yielding attachment described between a pull connection 14 and crank-arm 13 for operating a series of box-gates. The rock-shafts of said vertical series, just mentioned, are all preferably arranged in the same vertical plane, and said shafts are preferably arranged transversely of the main frame and separately mounted or journaled in the front uprights or posts thereof. These rock-shafts are arranged suitable distances apart, so as not to interfere with each other in operating, and each shaft has a pair of forwardly-extending radial rigid arms 82', rigidly connected at their front ends by a cross rod 82''. The cross-rods 82'' are preferably arranged in a vertical series one under the other, and each is arranged transversely of and usually resting against the rear longitudinal edges of all the vertical slides 81. The slides are arranged with inward rigid projections $81^3$ from their rear edges resting on certain cross-rods 82'', so that when a slide is depressed it will depress the cross rod or rods engaged by its projection or projections $81^3$, and thus rock one or more rock-shafts to set a certain main conveyer-stop 42 and to set or elevate a certain vertical series of box-gates. The vertical slides operated by keys corresponding to all the letter-boxes except those of the topmost row and those corresponding to the last boxes (boxes F) of each horizontal row have two projections $80^3$ to rock two shafts, one of which will swing a stop 42 inwardly to stop the main conveyer at a certain branch passage and the other rock-shaft to force up a certain bar 12 and open the vertical row of box-gates, which includes that of the particular box to which the letter is to be delivered. The vertical slides connected to the keys corresponding to the boxes of the topmost row each have but one projection $81^3$ to operate one of the upper five shafts controlling the box-gates, as no rock-shaft is necessary to operate the main conveyer-stop opposite the last or top branch passage, said stop being permanently or at least normally located in the path of the conveyer. The slide operated by the key corresponding to the box F of the last or top row of boxes does not need even one projection $81^3$, as it is not necessary to operate a rock-shaft therefor nor to set a gate or stop to cause the delivery of a letter into said box. The key corresponding to said box on being depressed merely sets the various operating mechanisms at work and the main-way conveyer moves until stopped opposite the last branch passage and the conveyer of said passage moves back to its limit of movement and the fixed or normally open gate of said last box automatically throws the letter into the said last box. The slides operated by the keys corresponding to the remaining boxes F each need but one projection $81^3$ to operate one of the rock-shafts 42' to set the devices which determine the particular branch passage to which the letter is to be delivered, as it is not necessary to set a box-gate for these boxes.

83 is a spring-upheld push or key bar having key 83' arranged in the bank with the other keys and bars, and the lower end of this key or push bar is preferably joined pivotally to the locking swinging bail. This extra key and push bar are provided for the purpose of swinging out the bail to release all the key-levers and push-bars when the machine has finished its work for the time being.

It is desirable to provide mechanism whereby the keys and bars operated thereby can be locked or held against movement after one key has been depressed and until the letter caused to be started from the common source by the depression of said key has been delivered into the box for which it started. Otherwise it might be possible for an inexperienced operator to depress a key and set certain letter-controlling mechanisms to cause delivery of the letter in the proper box and then before said letter has reached its box depress another key and return the proper gate and stop and set other and wrong gates and stop, and thus cause delivery of the letter to the wrong box by the letter-moving mechanisms first set in operation by the previous depression of the proper key. Various devices can be provided to prevent this accidental operation of the machine or premature depression of a subsequent key. As a convenient lock to accomplish this object and for the purpose of illustrating an example I show a vertically-disposed locking-lever 84, arranged at the back of the apparatus and fulcrumed at an intermediate point within its length to swing vertically. The fulcrum-point of the lever is indicated by 84', and the lever is so arranged with respect to its fulcrum that its lower end, provided with a notched or rabbeted extremity or shoulder 84", is normally held by a retractive spring $84^3$ over and bearing against a lateral pin or projection $84^5$, rigid with the vertically-movable front end of the trip-lever 61, which controls the dog 50'. The notched or shouldered end of locking-lever 84 when free to move under its spring is thus located over and against said projection and positively holds said lever 61 down, and hence firmly holds the locking-bail against outward swing and prevents downward movement of any one of the key-operated levers bearing on said bail. The upper end of said locking-lever is extended upwardly into the path of the main letter-conveyer-operating sweep about at the point where said sweep reaches its limit of forward swing. Hence when said sweep is in its normal position it engages the upper end of said lock-lever 84 and presses said end rearwardly against the tension of spring $84^3$, while the lower shouldered end of said lever is moved away from the trip-lever 61. Said trip-lever and the key-lever bail are hence all free to operate. When a key has been depressed and the various operative parts have been set in motion and said sweep starts on its rearward swing, the locking-lever 84 is released and swings in over trip-lever 61 and firmly locks the same and the bail and key-levers and keys against operative action. When said sweep completes its stroke and returns to its normal position, it engages the locking-lever 84 and releases the trip-lever 61 and bail, as the letter-moving parts have then delivered the letter and are ready to receive another letter. I do not desire to limit myself to this particular lock shown and described, but wish to broadly cover any lock for substantially the same purpose.

A pile of any suitable number of pieces of mail-matter with the addressed faces upwardly is placed on the table 15, while the swinging frame carrying fingers 24" is held forwardly out of the way. Links $24^5$ are at their outer ends pivotally joined to said swinging spring-held frame 24 and at their inner ends are pivotally joined to the upright pawls 20, so that when said letter-holding fingers 24" are drawn forwardly away from the table to permit the location of a pile of letters on the table the pawls will also be drawn forwardly from the ratchet-teeth of the table-legs, so that the table can be pressed down to receive the pile of letters to the extent necessary to have the topmost letter beneath the presser or guide feet 29 and beneath the upper ends of fingers 24" when in their normal positions. When the frame carrying said letter-holding fingers is released, said fingers are returned to their normal positions against the letters and said pawls are returned to their normal positions against the ratchet-teeth. The inner ends of said links $24^5$ can be slotted to permit the independent outward movement of the pawls as they slip over the ratchet-teeth as the table 15 moves upwardly with the removal of letters therefrom to constantly keep the topmost letter of the pile in the proper position with respect to the feeders, guide-plates, and other parts acting thereon. On the depression of a manually-operated actuating or operating device (such as a key) indicating the letter-box to which the topmost letter of the common pile or source belongs the letter-controlling means (such as a main conveyer stop or controller and a box-gate) are set or actuated to cause delivery of the letter to said particular predetermined box. The driving power of the machine is simultaneously thrown into operative communication with the various letter-moving devices, and the power-operated initial feeder removes said topmost letter of the pile (or from the common source) and causes the delivery thereof to the main conveyer, which delivers the same to the particular branch-passage letter mover or conveyer which moves the single letter to and drops the same into the particular predetermined box indicated by the key depressed. On the starting of the letter-moving devices said manually-operated devices are locked to prevent operative movement thereof or of the set letter-controlling devices until the particular letter has reached its particular box. The operative letter-moving devices make but one complete stroke or letter-moving action and return on the operation of a manually-operated device and then are all thrown out of action and operative communication with the driving power. It requires the operative movement of a manually-operated device to again throw the letter-moving mechanisms into action.

All of the letter moving, directing, and controlling parts are made of very light and yet strong material, and the movements thereof are preferably very rapid and in some instances practically instantaneous, and the letters are taken from the common source and distributed into their various predetermined points or delivery locations at a high rate of speed and with accuracy, the speed of the apparatus within practical limits being only gaged or determined by the experience, speed, and accuracy of the particular operator.

Other operating devices might be provided for the letter-conveyers than the endless connections shown, and I do not limit all features of my invention thereto.

I do not wish to limit all features of my invention to the employment of several letter-conveyers nor to conveyers of the general type or construction described. Various initial feeding devices can be employed, and in some instances an initial feeding device need not be employed. Also the pile of letters at the common source can be held and supported by various devices, and I do not wish to limit my invention to the devices shown for this purpose. Also various operating devices can be provided for the moving parts and various constructions of trip and starting devices, and I do not wish to limit all features of my invention to the constructions as shown for performing these various functions.

I do not wish to limit myself to a lock to hold the letter-controlling devices until each letter has reached its delivery point or box used in the particular apparatus shown nor to this particular type of a mail-distributing apparatus, as I claim to be the first to produce a lock for this purpose applied to any type of mail-distributing apparatus. This same statement in effect applies to other broadly new features of my invention.

My invention is not limited to handling letters, and I use the term "letters" herein as applying generically to any class or type of mail-matter. I also use the term "boxes" as applying broadly to my repositories or delivery-points for the various letters, whether or not receptacles in the narrow sense of the term be employed for this purpose. I also call attention to the fact that I do not wish to limit all features of my invention to the particular arrangement of letter-boxes shown and described.

Having thus fully described my invention, what I claim as new, and desire to secure by Letters Patent of the United States, is—

1. A mail-distributing apparatus comprising horizontal series of letter-receptacles opening into and provided with series of horizontally-arranged letter-passages ranging over the series of receptacles, respectively, means to convey the letters separately to any one of said passages, and means to move the letters in said passages, substantially as described.

2. A mail-distributing apparatus having a box-case formed with open-top boxes and horizontally-disposed branch letter-passages, and a vertical main letter way or passage intersecting all of said branch passages, substantially as described.

3. A mail-distributing apparatus having a series of letter-receptacles arranged in horizontal tiers or rows, and horizontally-movable letter-moving means movable longitudinally of and along each tier or row, substantially as described.

4. A mail-distributing apparatus having series of rows of letter-boxes, a series of reciprocating letter-movers movable along said rows, and a variable-stroke main letter-mover common to all of said reciprocating letter-movers, substantially as described.

5. A mail-distributing apparatus comprising series of horizontal rows of boxes having top openings, means to move letters above said rows, respectively and drop a letter into any box, and means to separately deliver letters to the letter-mover of any horizontal row, substantially as described.

6. A mail-distributing apparatus having a case of boxes divided into horizontal rows with letter-passages between the rows and opening into the boxes of the rows, letter-conveying devices, and controlling mechanisms, whereby each letter is delivered into a predetermined box, substantially as described.

7. A mail-distributing apparatus comprising a case of boxes, each box having an end opening and a top opening, said boxes arranged in horizontal series with horizontal letter-passages between the series and along the open tops of the boxes, substantially as described.

8. A mail-distributing apparatus having series of letter-boxes, branch letter-passages opening into the same, means for moving letters in said passages, a main letter-conveyer arranged to receive the letters from a common source and carry the letters one at a time to any branch passage and deliver the same to the letter-moving means thereof, and mechanisms for stopping said conveyer at any one of said passages, substantially as described.

9. A mail-distributing apparatus having a vertically-movable letter-conveyer, and series of horizontally-movable letter-conveyers to one of which at each stroke said vertically-movable conveyer presents a letter, and series of boxes along which the horizontally-movable conveyers pass and into a box of which a letter is dropped at each stroke, substantially as described.

10. A mail-distributing apparatus comprising vertically-arranged horizontal tiers of open-top boxes, with horizontal letter-passages between the horizontal tiers, in combination with letter moving and controlling mechanisms, arranged to receive the letters from a common source and deliver each letter into a predetermined box, substantially as described.

11. A mail-distributing apparatus wherein the letters are taken from a common source and delivered and distributed to various predetermined points or locations, comprising letter-conveying devices, and controlling mechanisms determining the delivery-point of each letter, conveying devices including a vertically-movable letter receiving and holding clamp formed to permit the letter being stripped therefrom, substantially as described.

12. A mail-distributing apparatus comprising a letter-conveyer, mechanism to deliver the letters separately into said conveyer, and series of conveyers having paths of movement intercepting the path of said first-mentioned conveyer, substantially as described.

13. A mail-distributing apparatus comprising a row of boxes having open tops, a letter-mover having a range of movement over said open tops, each box having a letter stripper or deflector arranged to intersect the path of movement of said letter-mover and intersect a letter propelled along the open tops of said boxes by the same, substantially as described.

14. A mail-distributing apparatus comprising series of letter-receptacles and series of letter-passages along the same, series of reciprocating letter-movers in said passages, and a variable-stroke-reciprocating main letter-mover intersecting the paths of movement of and arranged to deliver a letter to any one of said passage letter-movers, substantially as described.

15. A mail-distributing apparatus having horizontal series of open-top letter-receptacles, arranged one above the other with intervening letter-passages, letter-moving mechanisms, and letter-controlling devices determining the particular horizontal passage to which a letter is delivered and the particular box in said passage into which the letter is dropped, substantially as described.

16. A mail-distributing apparatus having horizontal rows of open-top letter-receptacles with horizontal letter-passages between the rows and above said open tops of the receptacles, said receptacles having movable-top letter strippers or deflectors, said strippers coupled together in vertical series, letter-moving devices, and controlling mechanisms, for said vertical series of strippers, respectively, substantially as described.

17. A mail-distributing apparatus comprising series of letter-receptacles, series of letter-passages for said series of receptacles, reciprocating letter-movers in said passages coupled together to move simultaneously, a variable-stroke letter-conveyer arranged to deliver one letter at a time to any one passage of said series, and means controlling the stroke of said conveyer and the passage to which each letter is delivered and the receptacle of said passage into which said letter is deposited, substantially as described.

18. A mail-distributing apparatus comprising series of horizontally-moving letter-conveyers, each conveyer arranged to deliver letters at various predetermined points or locations along its path of movement, a vertically-movable letter-conveyer intersecting the paths of movement of all of said horizontal conveyers, and mechanisms determining the particular horizontal conveyer to which each letter is to be delivered, and the particular location at which said horizontal conveyer deposits said letter, substantially as described.

19. A mail-distributing apparatus arranged to receive letters from a common source and move and distribute the letters to and deliver them at various predetermined locations comprising a variable-stroke, vertically-reciprocating letter-conveyer, yielding actuating connections therefor, and mechanisms arranged to deliver a letter from the common source into said conveyer at each stroke thereof, substantially as described.

20. A mail-distributing apparatus arranged to move letters separately from a common source and deliver them at various predetermined locations, comprising initial feeding mechanisms arranged to take the letters from the common source, a reciprocating letter-clamp lift normally located in position to receive the letters from said initial feeding mechanisms, mechanisms determining the delivery location of each letter, and actuating mechanisms, substantially as described.

21. A mail-distributing apparatus comprising a case of boxes wherein the boxes are formed in horizontal rows with intervening letter-passages extending longitudinally of the rows, each passage communicating with all the boxes of its row, a vertical main letter-way arranged at one end of said case and common to all said passages, letter-conveying devices arranged to receive the letters one at a time at the lower portion of said way and to move the same upwardly in the way and horizontally in any one of said passages to any one of said boxes, and letter-controlling devices, substantially as described.

22. In a mail-distributing apparatus wherein the letters are taken from a common source and distributed to various predetermined points of delivery, a vertically-movable yieldingly-upheld support for the common pile of letters, and pawl-and-ratchet mechanism holding said support against downward movement and permitting the free upward movement thereof and provided with means for releasing said support from said mechanism to permit downward movement of said support, substantially as described.

23. In a mail-distributing apparatus, a vertically-movable support for the pile of letters, a toothed leg movable vertically with said support, a pawl in engagement with the teeth of said leg and permitting free movement of the support in one direction and holding the same against movement in the opposite direction, a movable yieldingly-held device connected with said pawl and adapted to move the same from operative relation to said leg, an initial feeder arranged to take the letters successively from the top of the pile, and letter-moving mechanisms to which the letters are successively passed from said feeder, substantially as described.

24. In a mail-distributing apparatus wherein the letters are taken from a common source and distributed to various predetermined delivery-points, the combination of a movable initial letter-feeder, a support for the common pile of letters movable toward said feeder which successively removes the outer letter from the pile, pawl-and-ratchet mechanism holding said support toward said feeder, mechanism for moving the support and pile of letters toward the feeder, and letter moving and distributing mechanisms to which the letters pass from said feeder, substantially as described.

25. In a mail-distributing apparatus, the combination of a frame, a vertically-movable support for the common pile of letters, mechanism yieldingly pressing said support upwardly, guiding means for the support movable vertically therewith and comprising a depending toothed leg, a pawl engaging said leg and holding the support against downward movement, a swinging letter-guide connected with said pawl, initial feeder to remove the letters from said pile, and letter guiding and holding means for the letters on said support, substantially as described.

26. In a mail-distributing apparatus, in combination, a frame, a movable letter-support, a guide-wall carried by the frame against which said letters are alined, yielding means to aline the letters against said wall, a letter throat or passage at the upper edge of said wall, a swinging feeder arranged above the support to move the topmost letter from the pile laterally through said throat, and yielding letter-holding means pressing the letters down on the support and against said wall, substantially as described.

27. In combination, a vertically-movable letter-support, means constantly and yieldingly pressing the same upwardly, the laterally-movable upright finger arranged beside said support and the pile of letters thereon, and yieldingly held inwardly and laterally against the edges of the letters on said support to force the letters horizontally and aline the same, and a vertical guide on the opposite side of the support from said finger and against which the letters are alined by said finger, substantially as described.

28. In combination, a wall, a letter-support movable along the wall, and adapted to receive a pile of letters with their edges resting against and movable along said wall, and a yielding letter-holder arranged at the opposite side of the support from said wall and alining and holding the letters inwardly to said wall, substantially as described.

29. In combination, a letter-support, letter-guiding means, the swinging fingers extending beside and yieldingly pressed against the pile of letters on the support, said fingers formed to exert pressure on the letters to hold the same down on the support as well as to exert inward pressure against the pile of letters and a vertical wall against which the letters are pressed and alined by said fingers, substantially as described.

30. In combination, a movable letter-support, a letter-guide beside the same, and the yieldingly-held fingers arranged opposite said guide and extending beside the letters on the support and pressing the same to said guide and formed with their ends deflected to project over the outer letter of the pile and exert pressure thereon, substantially as described.

31. In combination, a frame, a vertically-movable letter-support, a pawl-and-ratchet mechanism, holding said support against downward movement and permitting upward movement thereof, a swinging frame arranged to engage and hold the pile of letters on the support, said frame being operatively connected with said pawl-and-ratchet mechanism, so that when said frame is swung laterally to permit placing a bundle of letters on the support, said pawl-and-ratchet mechanism will be released to permit downward movement of the support to receive the letters.

32. In combination, a frame, a letter-support, a guide-wall beside the same having a fixed curved letter-guiding edge over which the letters are successively moved from the letter pile on said support, a yielding separator-finger behind and projecting past said wall into the path of the letters over the same, means for holding the letters to said wall, and a letter-feeder, substantially as described.

33. In combination, a letter-support, for a pile of letters, a letter-guide, means to move the letters successively and laterally from said pile, a yieldingly-held depending rock-arm, and a presser or guide foot arranged above the inner portion of the outer letter of the pile and fixed on the free end of said arm, substantially as described.

34. In combination, a support for a pile of letters, an edge or guide over which the topmost letter is moved laterally from the pile, letter-moving means behind said guide and receiving the letter passed thereover, a guide or presser foot above said guide and under which each letter from the pile is forced, and a letter-feeder above the pile and arranged to move past said foot and deliver the letter to said moving means, substantially as described.

35. In a mail-distributing apparatus, the combination of an upwardly-moving support for the common pile of letters, a guiding-throat beside the pile, letter-moving means behind said means, a swinging feeder above the pile of letters and arranged to force the topmost letters of the pile successively through said throat and into the letter-moving means, driving means, actuating mechanisms for said feeder and letter-moving means, and a controlling device for throwing said driving means into operative communication with said actuating mechanisms, whereby when said controlling device is operated said feeder and moving means will perform a letter-moving stroke and then stop, substantially as described.

36. In a mail-distributing apparatus, the combination of a letter-conveyer, a support for the common pile of letters, initial feeding mechanism to take the letters successively from the pile and pass the same to said conveyer, and a pusher to push each letter into said conveyer, and operating mechanisms timed to operate the parts in proper sequence, substantially as described.

37. In combination, an initial feeder to take letters successively from a common source, a conveyer to receive the letters therefrom comprising a spring letter-clamp, a pusher-finger arranged to engage the outer edge of the letter and insure its proper delivery into said letter-clamp, substantially as described.

38. In a mail-distributing apparatus, the combination of a letter-conveyer, an initial feeder for supplying letters successively to said conveyer, a rock-shaft provided with a letter-pushing finger interposed between the feeder and conveyer and normally resting out of the letter-path, actuating mechanisms for the feeder and conveyer, and operating devices, for said rock-shaft timed to turn said shaft, after the letter has passed beyond the finger, and cause the finger to engage the edge of the letter and push the same completely into the conveyer, substantially as described.

39. In combination, an initial letter-feeder arranged to take the letters successively from a common source, letter-moving mechanisms arranged to deliver the letters at various predetermined delivery-points, controlling devices determining the delivery-points of the letters, driving means, operating connections for said feeder, said feeder being normally inactive, and a manually-operated device arranged to operatively connect said feeder-operating connections and said driving means and cause a feeding stroke of said feeder which thereupon returns to its normal inactive position, substantially as described.

40. A mail-distributing apparatus constructed and arranged to take the letters from a common source and deliver them separately at various predetermined delivery-points comprising a normally inactive initial feeder provided with power-driven operating connections normally out of operative communication with the driving power and arranged to make only one feeding stroke when thrown into gear with its driving power, substantially as described.

41. A mail-distributing apparatus having an initial feeder arranged to take the letters successively from a common source and cause delivery thereof to letter-moving means, combined with a main driving mechanism, normally inactive operating mechanism, for said feeder, means for operatively coupling said operating mechanism with said driving mechanism and causing one feeding stroke of said feeder, and a controlling device for said means, substantially as described.

42. In a mail-distributing apparatus, the combination of a normally inactive initial feeder, continuously-operating driving power, normally inactive feed-operating connections, a clutch mechanism arranged to operatively connect said driving power and said operating connections and to automatically disconnect said parts on the completion of a feeding stroke, and a manually-operated controlling device for said clutch mechanism, substantially as described.

43. In a mail-distributing apparatus, a normally inactive initial feeder, continuously-operating driving means, normally inactive feeder-operating means, a clutch mechanism between said driving and operating means and normally out of gear, a trip normally holding said clutch out of gear, and a series of manually-operated controlling devices all separately acting on said trip to throw said clutch into gear, substantially as described.

44. In a mail-distributing apparatus, a continuously-rotating driving mechanism, a normally inactive initial letter-feeder, means for operatively coupling said feeder with said driving mechanism for effecting a single feeding stroke of the feeder, and then automatically disconnecting the same from the driving mechanism, and a manually-operated controlling device for throwing said feeder into operative connection with said driving mechanism, substantially as described.

45. In a mail-distributing apparatus, a normally inactive initial feeder, normally inactive operating devices for said feeder, a continuously-operating driver, a clutch to operatively connect the driver and operating devices, a releasing or trip device to normally hold the clutch with said driver and devices out of operative communication and to automatically disconnect said parts when the feeder has been operated a complete feeding stroke, and controlling operating means for said trip device, substantially as described.

46. In a mail-distributing apparatus, an initial feeder comprising a rock-shaft having a depending feeder-arm, a rocking lever connected to rock said shaft a feed stroke, a spring acting on said lever in one direction, a normally inactive rotary device to rock said lever in the opposite direction, a continuously-rotating driver, and a normally inactive clutch mechanism between the rotary device and driver provided with controlling means, substantially as described.

47. In a mail-distributing apparatus, the combination of a normally inactive initial feeder arranged to take letters successively from a common source, normally inactive letter-moving means arranged to successively receive said letters and deliver them at various predetermined points, controlling mechanisms determining the delivery-point of each letter, a bank or series of separate manually-operated starting and setting devices, continuously-moving driving mechanism, and mechanism operated by any one of said manually-operated devices to throw said feeder and letter-moving means into operative connection with said driving mechanism, substantially as described.

48. In a mail-distributing apparatus, the combination of an initial letter-feeder, a continuously-rotating driver, a normally inactive rotary device having a cam projection, a lever yieldingly held to said projection, operative connections from said lever to said feeder, a clutch mechanism to throw said rotary device and driver into operative connection, a trip mechanism to automatically operate said clutch to operatively disconnect said parts on the completion of a certain movement by said rotary device and to normally hold said rotary device inactive, and series of manually-operated controlling devices separately acting on said trip to throw said clutch into action, substantially as described.

49. A mail-distributing apparatus, constructed and arranged to move letters from a common source and distribute the same to various predetermined points of delivery, comprising normally inactive letter-moving devices and a normally inactive initial feeder, mechanisms controlling the delivery-points of the letters, a continuously-operating driver, a normally inactive rotary member, mechanical operating connections for said letter-moving devices and feeder actuated from, and by said rotary member, a clutch mechanism to operatively connect said rotary member and driver, means to operate said clutch to disconnect said driver and member at the completion of each operating movement of the member, a series of manually-operated setting and starting devices, and clutch-controlling mechanism operated by any one of said setting and starting devices for throwing the member into operative communication with the driver, substantially as described.

50. In a mail-distributing apparatus, the combination of normally inactive letter-moving mechanisms comprising an initial feeder, a continuously-rotating driver, a normally inactive rotary member operatively connected with said letter-moving mechanisms to actuate the same, an operative connection to operatively couple said driver and rotary member together, a swinging lever normally holding said connection to disconnect the driver and member, a series of separate manually-operated setting and starting devices, a swinging frame common to all and operated by any one of said setting and starting devices to rock said lever to cause said connection to couple the driver and rotary member together, substantially as described.

51. In a mail-distributing apparatus, the combination of an initial letter-feeder, a main letter-conveyer, series of branch-passage letter-conveyers, a rotary member, an operating connection, operatively connecting said rotary members and the feeder comprising a lever, operating connections for said various letter-conveyers, operatively connecting the same with said rotary member and comprising levers, actuating means for said rotary member, and starting and stopping, devices, substantially as described.

52. In a mail-distributing apparatus, the combination of a reciprocatory normally inactive initial feeder, a rotary member having a radial cam projection, a swinging lever operatively connected with said feeder to move the same, a spring device yieldingly holding said lever into the path of said cam projection, said cam arranged to swing the lever outwardly and allow the spring to move it inwardly at the beginning of each rotation of said rotary member, and driving means for said rotary member comprising clutch mechanism and a trip device, substantially as described.

53. In a mail-distributing apparatus, the combination of letter-moving mechanisms, actuating means operatively connected therewith, a driver, make-and-break mechanism between said driver and actuating means periodically throwing the actuating means into operative connection with the driver, said actuating means comprising a lever and a cam acting thereon and a rotary eccentric, said make-and-break mechanism comprising a movable clutch and a swinging stop-lever at one end having a shoulder to engage the clutch, and lifting means to engage the opposite end of said lever, and series of manually-operated setting and starting devices controlling said lifting means.

54. In combination, a normally inactive reciprocatory initial letter-feeder, a rotary operating member therefor normally inactive, a continuously-rotating driver, a clutch carried by said member and constantly tending to operatively connect said driver and said member, a swinging lever yieldingly held in the path of said clutch and normally holding the same out of operative position and automatically throwing it from operative position when said rotary member has completed a rotation, and controlling devices, substantially as described.

55. In combination, a reciprocatory letter-feeder having a biting portion arranged to positively take hold of and feed each letter, a spring device to yieldingly move the feeder on its feeding stroke, and means to positively move the feeder on its return stroke against the tension of said spring device comprising a periodically-movable power-driven striker, substantially as described.

56. In combination, a letter-way, a reciprocatory positive feeder to successively and positively force the letters from said way, actuating connections for said feeder comprising a feed-stroke spring yieldingly moving the feeder on its feed stroke, and power-driven mechanism driving said connections to move said feeder against the tension of said spring on its return stroke, substantially as described.

57. In a mail-distributing apparatus, the combination of a pair of coöperating feed-rolls, a vertically-movable letter-conveyer normally arranged at the bite between said rolls, and movable mechanism for freeing each letter from the rolls so that the conveyer can move the letter past said rolls, substantially as described.

58. A mail-distributing apparatus embodying mechanisms for receiving letters from a common source and distributing them to various predetermined delivery-points, which includes a letter-conveyer comprising a spring-clamp having jaws between which the letters are carried, and mechanism to strip the letters from said jaws, substantially as described.

59. In combination, in a mail-distributing apparatus, a letter-conveyer comprising a spring letter-clamp having opposing gripping-jaws, mechanism to place letters into said jaws, and means at various points to remove letters from said jaws, substantially as described.

60. A letter-supporting conveyer provided with operating mechanism and comprising jaws between which each letter is entirely received, means independent of said jaws for placing the letters between said jaws, and mechanisms independent of said jaws for removing the letters from said jaws, substantially as described.

61. In combination a movable spring letter-receiving clamp, mechanism independent of said clamp at the normal position of said clamp to place letters in said clamp, mechanism for moving said clamp, and letter-moving mechanism arranged to project into the path of said clamp and remove a letter therefrom, substantially as described.

62. A letter-carrier comprising a support, means for moving the same, opposing jaws, one of said jaws mounted to rock, means yieldingly and constantly holding said jaws toward each other, means to force letters between said jaws, and means to force letters from said jaws, substantially as described.

63. A letter-supporting conveyer comprising a slide carrying parallel elongated letter-holding jaws yieldingly held toward each other to entirely receive between themselves and carry letters of various shapes and sizes, substantially as described.

64. A letter-conveyer comprising a movable support, having a pair of separated rigid jaws and a pair of opposing spring-held movable jaws, each pair of opposing jaws having beveled ends and shoulders to engage an edge of the letter therein, substantially as described.

65. A letter-conveyer comprising a movable support having cross-pieces, a rigid jaw on one cross-piece, a spring-held movable radial arm centered on the other cross-piece, and a jaw pivotally joined to said arm and opposing said first-mentioned jaw, substantially as described.

66. In a mail-distributing apparatus, the combination of letter-conveyer arranged to receive letters successively from a common source and having a variable stroke to deliver said letters at various points of delivery, controlling mechanism determining each stroke of said conveyer, and mechanisms to receive the letter from said conveyer at each stroke, substantially as described.

67. In a mail-distributing apparatus, the combination of a letter-conveyer, mechanism for moving the same variable distances at different strokes, means to deliver a letter to said conveyer, means to stop said conveyer at various points, and devices to remove the letters from said conveyer at said stopping-points, substantially as described.

68. In a mail-distributing apparatus, a letter-conveyer, mechanism for moving said conveyer variable distances, means for delivering letters to said conveyer at a common source, a series of devices for stopping said conveyer at any one of a series of locations, series of manually-operated controllers corresponding to the final delivery-points of the letters and operatively controlling said devices, series of letter-movers constructed to remove the letters from said conveyer at any one of said locations, and letter-engaging devices operated by said controllers and determining the final delivery-points at which said letters are deposited by said letter-movers, substantially as described.

69. A mail-distributing apparatus embodying mechanisms to take letters from a common source and distribute them to various predetermined delivery-points comprising a letter-conveyer having a variable stroke to deliver different letters at different locations at various strokes, substantially as described.

70. In a mail-distributing apparatus, the combination of a main letter-conveyer receiving the letters from a common source, series of letter-movers arranged in different planes intersecting the path of movement of said main letter-conveyer and each constructed to remove a letter from said conveyer, stops arranged to stop said conveyer to deliver its letter to any one of said letter-movers, and mechanism for setting any one of said stops, substantially as described.

71. In a mail-distributing apparatus, the combination of vertically-disposed horizontal rows of letter-boxes, series of letter-movers movable along said rows, mechanism for simultaneously operating all of said movers an approximately fixed distance at each stroke, means to deflect a letter from any letter-mover into any box in its row, a main letter-conveyer having a variable path of movement to stop in the path of any letter-mover, and deliver a letter thereto and mechanism determining the limit of stroke of said conveyer, substantially as described.

72. In combination, several rows of letter-boxes, each box having a letter-gate, series of letter-moving rakes movable over the gates of said rows of boxes, respectively, mechanism to move all of said rakes simultaneously, a main letter-conveyer, series of stops arranged to move into the path of said conveyer and stop the same in the path of movement of any rake, the conveyer and rakes so constructed that a rake can strip a letter from the conveyer and move the same along the gates of its row of boxes, series of manually-operated controlling devices corresponding to and indicating said boxes, certain devices operatively connected with certain stops and with certain gates, and driving means, substantially as described.

73. In a mail-distributing apparatus, the combination of branch-passage letter-movers, letter-receptacles, a reciprocating main letter-conveyer, and operating devices therefor comprising a flexible connection and a spring moving the conveyer in one direction and permitting stopping thereof at various locations, substantially as described.

74. In a mail-distributing apparatus, a reciprocating letter-carrier having operating devices embodying an endless flexible connection in which the carrier is included, substantially as described.

75. In a mail-distributing apparatus, a series of reciprocating branch letter-movers, endless flexible connections in which said movers are included, and operating devices to which all of said connections are coupled to move simultaneously, substantially as described.

76. In a mail-distributing apparatus, the combination of series of letter-receptacles, branch-passage letter-movers therefor, letter-directing means, a main letter-conveyer common to all of said letter-movers and arranged to deliver a letter to any one of them, an oscilating sweep, mechanism for swinging the same, and a flexible connection from the sweep to the conveyer for moving the same and a spring for returning the conveyer, substantially as described.

77. In a mail-distributing apparatus, the combination of several reciprocating branch-passage letter-movers, letter-receptacles arranged along the said passages, a reciprocating main letter-conveyer movable in a plane intersecting the paths of movement of said letter-movers, a sweep connected with all of said letter-movers and moving them simultaneously, a sweep connected with and moving said main conveyer, said main-conveyer sweep operated by said letter-mover sweep in one direction, and a spring moving the same in the opposite direction, and driving means, substantially as described.

78. In combination, the main letter-conveyer, the branch-passage letter-movers, an oscillating sweep connected to move said movers, operating means therefor, a corresponding sweep connected to move said conveyer, a spring device acting on said conveyer-sweep in one direction, said mover-sweep acting on the conveyer-sweep against said spring, and a yielding holding device between said sweeps whereby the conveyer-sweep is held back for a limited period after the mover-sweep has started on its strokes, and whereby the conveyer-sweep has a variable stroke, substantially as described.

79. In a mail-distributing apparatus, the combination of a main letter-conveyer, series of branch letter-movers having paths of movement intersecting the path of movement of said conveyer, and operating mechanisms for said parts timed to start the movers on their initial and return strokes before said conveyer starts on its initial and return strokes, substantially as described.

80. A mail-distributing apparatus having a conveyer-clamp, and a reciprocating letter-rake comprising a head with laterally-springing shouldered fingers arranged to slip along the face of and allow the shoulders to move past the edge of a letter held in said clamp, whereby when the rake moves in the opposite direction the letter will be drawn from the conveyer and with the rake, and operating devices, substantially as described.

81. A mail-distributing apparatus comprising letter-moving mechanisms, series of manually-operated controlling devices, whereby the delivery-point of each letter is determined, and a locking mechanism for said series of controlling devices thrown into action to lock said devices by the operative action of one of said devices and holding said devices against operative movement, substantially as described.

82. A mail-distributing apparatus embodying mechanisms to take letters successively from a common source and deliver them at various delivery-points, comprising mechanisms controlling the delivery-points of the letters having a lock applied and released on each letter-delivering action of the apparatus, substantially as described.

83. In a mail-distributing apparatus, the combination of letter-moving mechanisms, series of letter-receptacles, devices determining the receptacle to which each letter is delivered, series of manually-operated means corresponding to and indicating said receptacles and controlling said devices, and a lock normally released and controlled by the letter-moving mechanisms, said lock holding all of said means against action after the operation of one, and until the letter-moving mechanisms complete a letter-moving stroke, substantially as described.

84. In combination, a row of letter-receptacles, swinging gates for said receptacles, mechanism for opening and closing said gates comprising spring devices, a letter-mover reciprocating over said gates and having a part extending into the path of the opening mechanism of any gate which is opened and arranged to move said mechanism to momentarily swing said gate to permit the passing of the mover, substantially as described.

85. In combination, rows of letter-receptacles with intervening letter-passages, swinging fingered gates for the passages, spring-fingered letter-rakes reciprocating over said gates, means for simultaneously operating said rakes, and means for setting said gates, substantially as described.

86. In a mail-distributing apparatus, in combination, series of letter-boxes, letter-conveying means for delivering the letters to said boxes, series of manually-controlled letter-controlling means determining the delivery-points of the letters, a lock mechanism for temporarily locking said controlling means, and mechanism for applying and releasing said lock, substantially as described.

87. In a mail-distributing apparatus, in combination, letter conveying and directing devices for moving the letters successively from a common source and distributing them to various predetermined delivery-points, series of manually-movable controlling means controlling said directing devices to deliver each letter to a point indicated by the particular means actuated, and a locking mechanism for said series of controlling means to temporarily lock the same against operative movement after each operative movement of one of said series.

88. A mail-distributing apparatus having letter moving and controlling mechanisms, series of manually-operated push-bars, series of levers coupled separately to said bars respectively, series of slides coupled to said levers respectively, series of rock-shafts beside said slides, certain slides operating certain rock-shafts and other slides operating other rock-shafts, a swinging bail to be pushed out and swung over any lever depressed, and to hold said lever until the bail is again swung out, and a trip mechanism operated by said bail, substantially as described.

89. In a mail-distributing apparatus, a continuous rotating shaft, a ratchet-wheel rotating therewith and yieldingly coupled thereto, a normally inactive eccentric provided with a swinging dog to engage the ratchet, trip mechanism controlling the dog, a spring device acting on the eccentric to hold the same to the trip device and thus lock the dog from the ratchet, a pitman from the eccentric, and letter-moving mechanism operatively connected with the pitman, substantially as described.

90. A mail-distributing apparatus having a sliding reciprocating letter-mover, an endless flexible connection in which said mover is secured, and means for moving said connection in opposite directions, substantially as described.

91. A mail-distributing apparatus comprising an oscillating sweep, a letter-conveyer, and an operative connection between the sweep and conveyer including a spring, substantially as described.

92. A mail-distributing apparatus comprising a bank of keys, letter-controlling devices operated thereby, a lock to hold any key depressed until another key is depressed, a separate lock-releasing key for said lock, for the purpose described, and letter-moving means, substantially as described.

93. In combination, in a mail-distributing apparatus, means to support a number of letters at a common source, letter moving and controlling mechanisms arranged to successively remove the letters from said common source and distribute the same individually to various points of delivery, and locking mechanism to prevent operative action of the mechanism to remove a letter from said common source until the previously-moved letter has been delivered at its point of delivery, substantially as described.

94. In a mail-distributing apparatus, the combination of letter moving and controlling mechanisms arranged to successively remove the letters from a common source and distribute the same individually to various predetermined points of delivery, and locking mechanism automatically controlled by the movement of said letter-moving mechanism, substantially as described.

95. In combination, in a mail-distributing apparatus, letter-moving devices, letter-controlling means determining the delivery-point of each letter, manually-operated movable elements for setting said controlling means to determine the delivery-point of each letter, and lock or stop mechanism, whereby said controlling means cannot be operatively set except at certain stages in the operation of the apparatus, substantially as described.

96. In a mail-distributing apparatus, the combination of letter-moving devices, controlling mechanisms determining the delivery-point of each letter, means to set the controlling mechanisms to determine the delivery-point of each letter, and devices preventing operation of said means while a letter is in transit to its delivery-point, whereby the apparatus is adapted to move and deliver one letter at a time, substantially as described.

97. In a mail-distributing apparatus, the combination of initial feeding devices, a letter-lift receiving the letters from said devices, manually-controlled means to stop said lift at various elevations, and mechanisms at said various elevations to remove the letters from said lift, substantially as described.

98. In a mail-distributing apparatus, the combination of a letter-carrier comprising spring-held jaws, means to insert letters forcibly into one end of said carrier, and means to remove letters forcibly from the opposite end of said carrier, substantially as described.

99. In a mail-distributing apparatus, the combination of a letter-carrier comprising opposing jaws yieldingly and constantly held toward each other, and supports for said jaws arranged so that a letter can be forced completely between and supported and carried entirely thereby, substantially as described.

100. In a mail-distributing apparatus, a vertically-reciprocating letter lift or support comprising jaws yieldingly held together in combination with means to force the letters between said jaws and against the tension thereof, substantially as described.

101. In a mail-distributing apparatus, a letter-carrier comprising double-end jaws yieldingly held together and arranged to yieldingly separate at both ends, substantially as described.

102. A mail-distributing apparatus comprising several series of receptacles into which the mail-matter is distributed, said series of receptacles arranged one above the other with horizontal intervening letter-passages, each receptacle having a letter-egress opening and open at the top into a letter-passage to form a letter-ingress opening, and letter moving and controlling mechanisms arranged to distribute letters into said passages and therefrom into said receptacles through their open tops.

103. A mail-distributing apparatus comprising a series of receptacles for mail-matter, each receptacle open at the top to form a letter-ingress opening, means normally bridging the open tops of the boxes against the enentrance of letters and forming a letter-floor above the boxes, and letter moving and controlling mechanisms determining the particular box into which each letter is deposited.

104. A mail-distributing apparatus comprising a case of letter-boxes, said boxes being arranged in horizontal rows with intervening letter-passages, each box having an egress-opening and open at the top into a letter-passage, letter-moving devices moving the letters in said passages and over the open tops of the boxes, and controlling mechanisms determining the particular box into which each letter is deposited.

105. In a mail-distributing apparatus wherein the letters are conveyed from a common source and distributed to various predetermined points of delivery, the combination of several horizontal series of letter-boxes arranged one above the other, each box having a letter-ingress opening, letter-moving devices having portions moving vertically to carry the letters from the common source vertically and successively to any one of the horizontal box rows and having portions movable horizontally along the openings of the horizontal box rows to receive the letters from said vertically-moving portions and to move the letters horizontally along said openings and deposit each letter through any box-opening of a row, and letter-controlling devices determining the particular box row to which a letter is to be delivered and the particular box in that row in which the letter is to be deposited.

106. In a mail-distributing apparatus wherein the letters are received from a common source and delivered to various predetermined points of delivery, in combination, a case of boxes or receptacles arranged in rows with horizontally-disposed intervening letter-passages, the boxes having letter-ingress openings from said passages, means movable vertically to all of said passages and upwardly from a common source located below all of said passages and adapted to convey said letters upwardly to any passage, letter-moving devices movable in said passages over said boxes and arranged to receive the letters from said vertically-movable means and drop the same into any box, and controlling devices, substantially as described.

107. In combination, in a mail-distributing apparatus wherein the letters are taken from a common source and conveyed and delivered to various predetermined points of delivery, a case of letter boxes or receptacles arranged with intervening branch passages between the rows of boxes, the boxes of each row opening into the passage thereof to receive letters therefrom, a support for the pile of letters at the common source, a letter-carrier movable past all of said branch passages to deliver letters thereto, means to deliver letters from said carrier to any of said branch passages, means to move the letters from the common source and force the same into said carrier, said carrier comprising opposing jaws constantly and yieldingly held together or toward each other to receive and grip the letters between the jaws, substantially as described.

108. In a mail-distributing apparatus, the combination of a normally inactive initial letter-feeder, actuating means operatively connected therewith, a driver, make-and-break mechanism between said driver and actuating means constructed and arranged to automatically throw the actuating means out of gear with the driver when said actuating means has completed one operating stroke, series of manually-operated setting and starting devices, and letter conveying and distributing mechanisms.

109. A mail-distributing apparatus, wherein the letters are conveyed from a common source and distributed to various predetermined points of delivery comprising a horizontal row of open-top boxes, movable gates breaking joints and bridging said open tops, means for opening and closing any gate, and letter-conveying devices, substantially as described.

110. A mail-distributing apparatus wherein the letters are distributed to various predetermined points of delivery comprising a row of letter-boxes having open tops, a series of swinging fingered gates forming a letter-floor above said open tops, a series of manually-controlled devices for independently opening said gates, one device for each gate, and letter-moving means arranged to move a letter in a horizontal position along said gates, whereby any opened gate will cause the letter to drop flat face down into the box of such gate.

111. In a mail-distributing apparatus wherein the letters are conveyed from a common source and distributed to various predetermined points of delivery, the combination, of letter conveying and controlling devices, series of manually-operated setting elements for said controlling devices, and a lock mechanism for said elements provided with applying and releasing means, substantially as described.

In testimony whereof I affix my signature in presence of two witnesses.

WILLIAM BARRY.

Witnesses:
 HUBERT E. PECK,
 GEO. E. FRECH.